United States Patent [19]

Camras

[11] 4,371,894
[45] Feb. 1, 1983

[54] VIDEO DISC TRANSDUCER SYSTEM AND METHOD

[75] Inventor: Marvin Camras, Glencoe, Ill.

[73] Assignee: IIT Research Institute, Chicago, Ill.

[21] Appl. No.: 111,461

[22] Filed: Jan. 11, 1980

Related U.S. Application Data

[63] Continuation of Ser. No. 826,054, Aug. 19, 1977, abandoned, which is a continuation-in-part of Ser. No. 519,340, Oct. 30, 1974, abandoned.

[51] Int. Cl.³ .............................................. H04N 5/76
[52] U.S. Cl. ...................................... 358/342; 358/348; 369/111; 369/121; 369/122; 369/14; 369/95
[58] Field of Search ................ 358/127, 128.5, 128.6, 358/130, 132, 214; 179/100.1 G, 100.3 V, 100.3 Z, 100.3 A; 365/218; 328/124; 360/9, 3; 369/121, 14, 120, 93, 101, 95, 122, 111, 125

[56] References Cited

U.S. PATENT DOCUMENTS

| | | | |
|---|---|---|---|
| 1,787,919 | 1/1931 | Watson | 358/128.6 |
| 2,005,914 | 6/1935 | Freund | 352/26 |
| 3,040,124 | 6/1962 | Camras | 358/127 |
| 3,198,880 | 8/1965 | Toulon | 358/128.5 |
| 3,239,602 | 3/1966 | Lemelson | 358/129 |
| 3,267,212 | 8/1966 | Goldmark | 358/132 |
| 3,333,058 | 7/1967 | Goldmark | 358/132 |
| 3,363,054 | 1/1968 | Mason | 179/100.3 V |
| 3,404,224 | 10/1968 | Revelo | 358/128.5 |
| 3,431,513 | 3/1969 | Nonmichi | 179/100.3 Z |
| 3,436,679 | 4/1969 | Fenner | 179/100.3 Z |
| 3,478,164 | 11/1969 | Southworth | 360/9 |
| 3,534,166 | 10/1970 | Korpel | 358/132 |
| 3,686,436 | 8/1972 | Camras | 360/116 |
| 3,701,846 | 10/1972 | Zenzefilis | 360/37 |
| 3,743,771 | 7/1973 | Ohta | 358/214 |
| 3,746,783 | 7/1973 | Gerritsen | 358/132 |
| 3,939,302 | 2/1976 | Kihara | 179/100.3 V |
| 3,943,559 | 3/1976 | d'Auria | 358/214 |
| 3,980,818 | 9/1976 | Browning | 179/100.1 G |
| 3,988,634 | 10/1976 | Denham | 328/124 |
| 4,051,528 | 9/1977 | Takeda | 179/100.3 Z |

OTHER PUBLICATIONS

"Reducing Aberrations in Rotating-Prism Compensators for Nonintermittent Motion Picures" by G. Schwesinger Journal of the Optical Society of America, vol. 42, No. 12, Dec., 1952.

*Primary Examiner*—Alan Faber
*Attorney, Agent, or Firm*—Hill, Van Santen, Steadman, Chiara & Simpson

[57] ABSTRACT

A video disc record having a spiral video record track which can provide reproduced video signals with a desired frame rate such as thirty frames per second while the disc record is rotated at a very low speed such as two revolutions per minute. A preferred transducer machine uses a pulsed light source to supply successive light images to a video camera readout. Control signals are recorded on helical control tracks so that reproduction thereof facilitates the generation of a desired standard video signal from the video camera.

28 Claims, 27 Drawing Figures

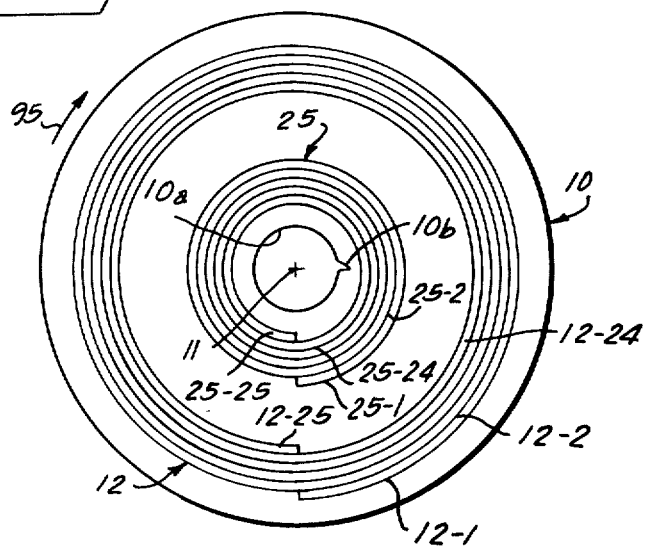
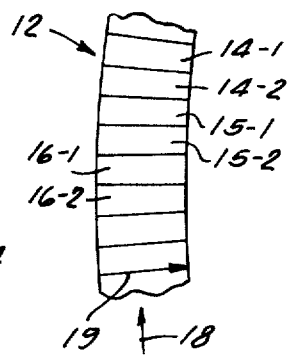
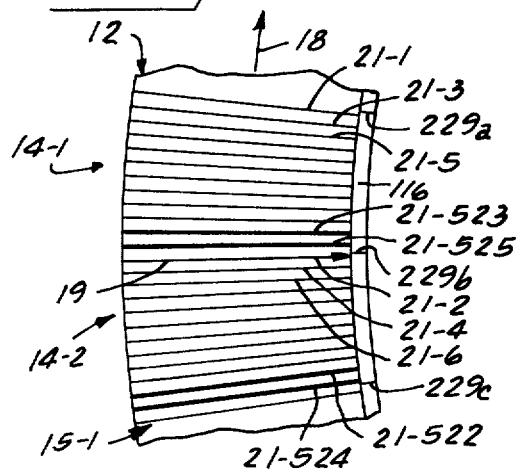
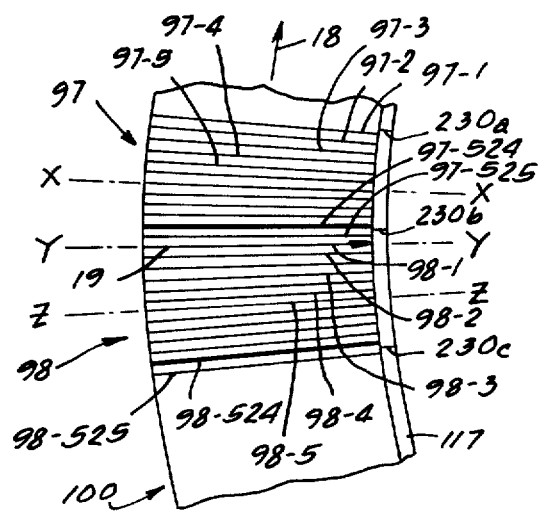
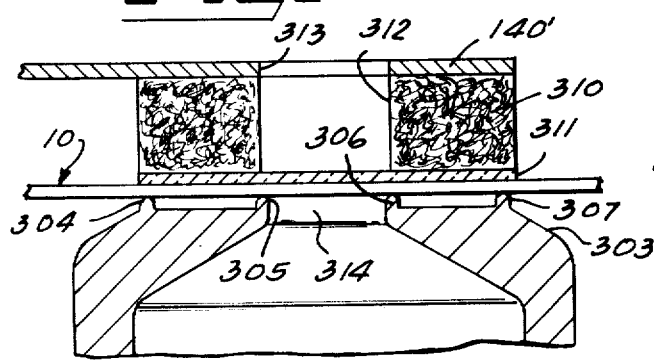
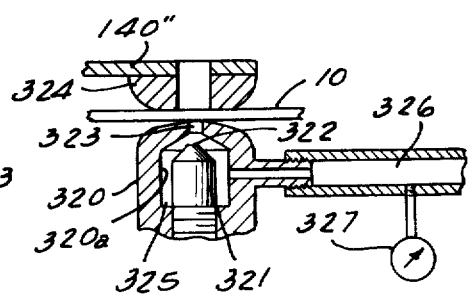

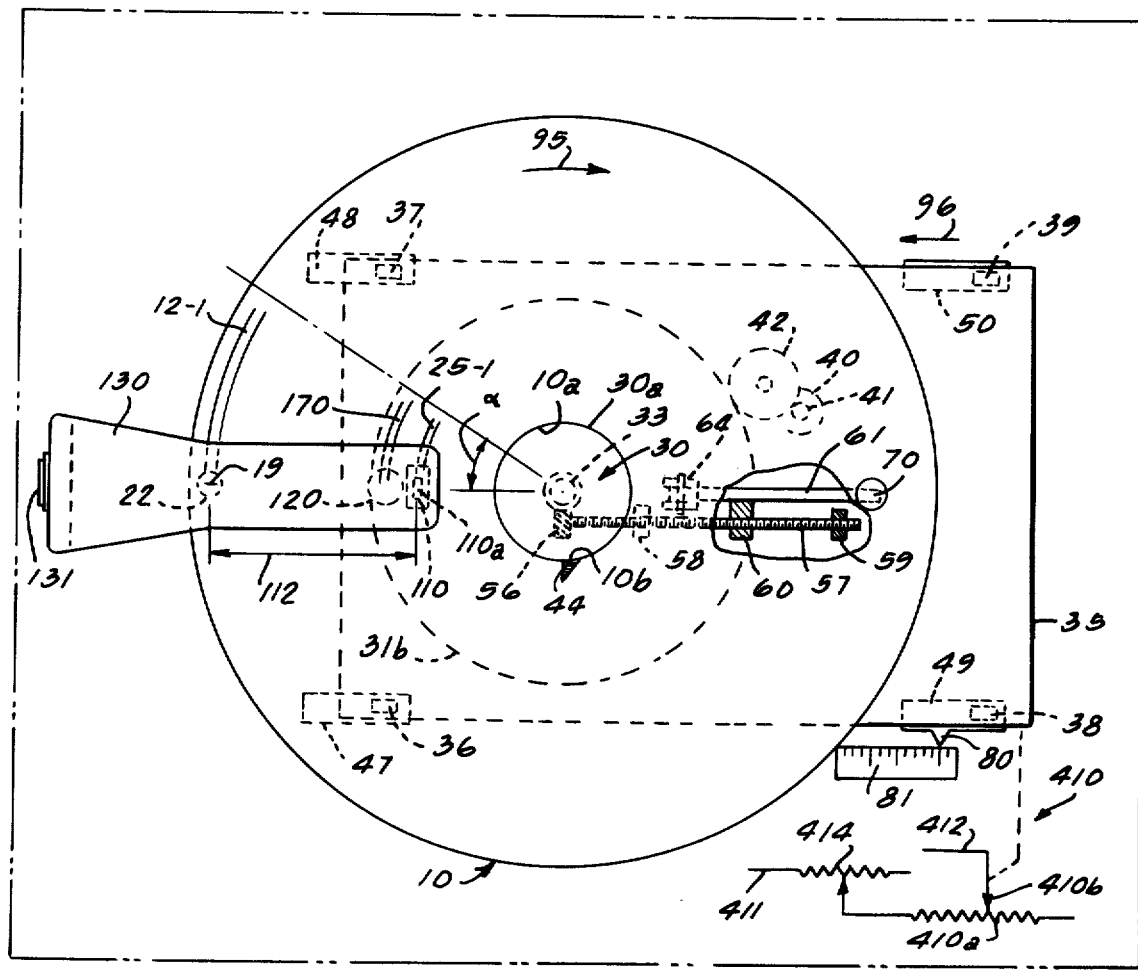
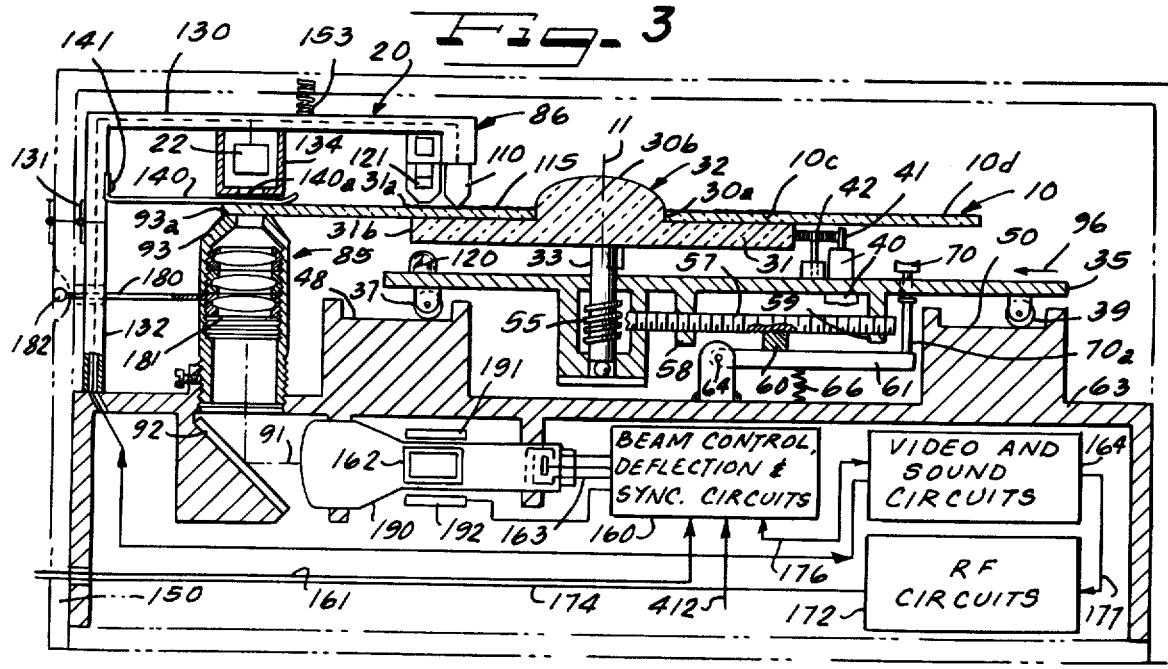

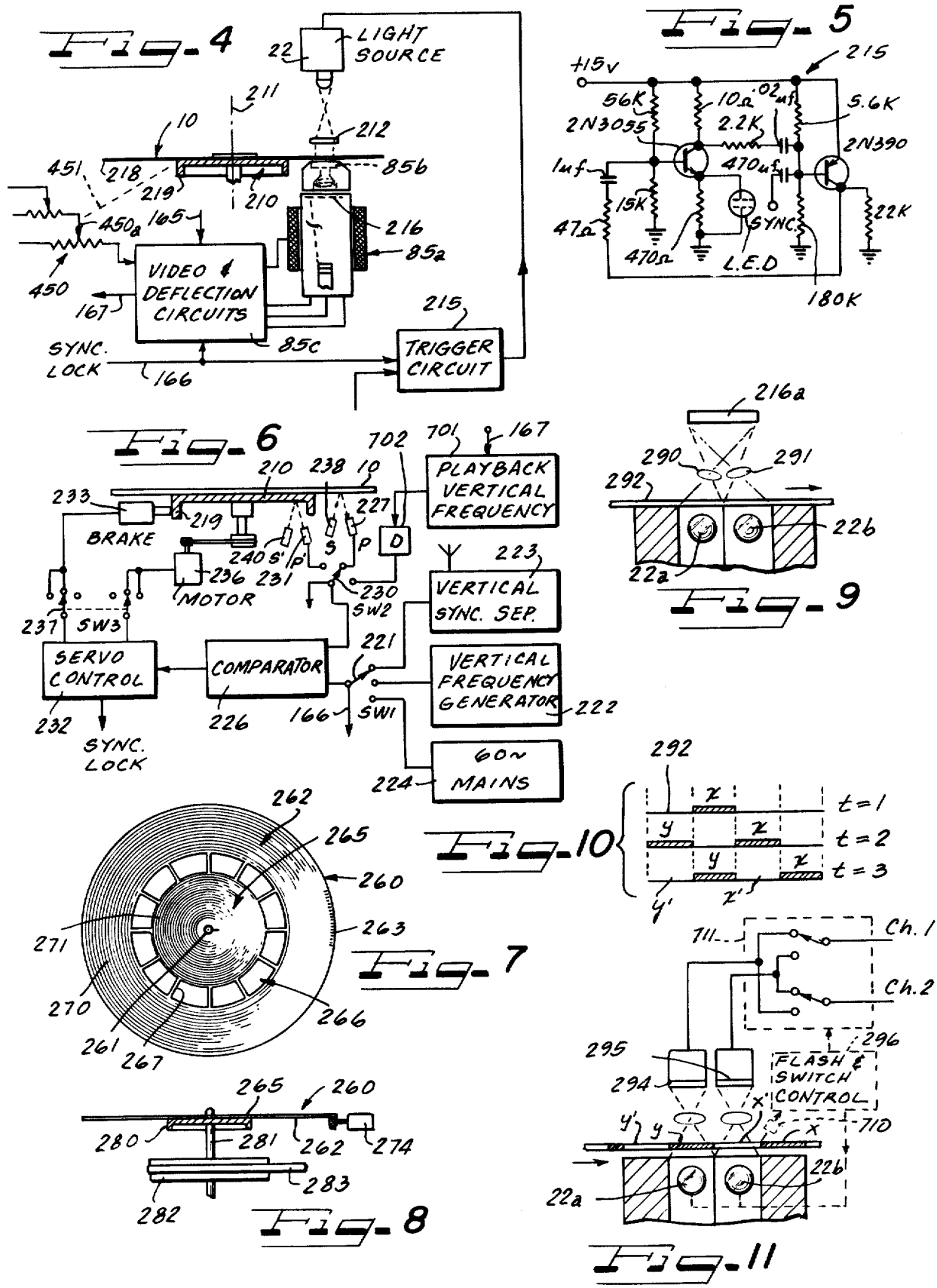

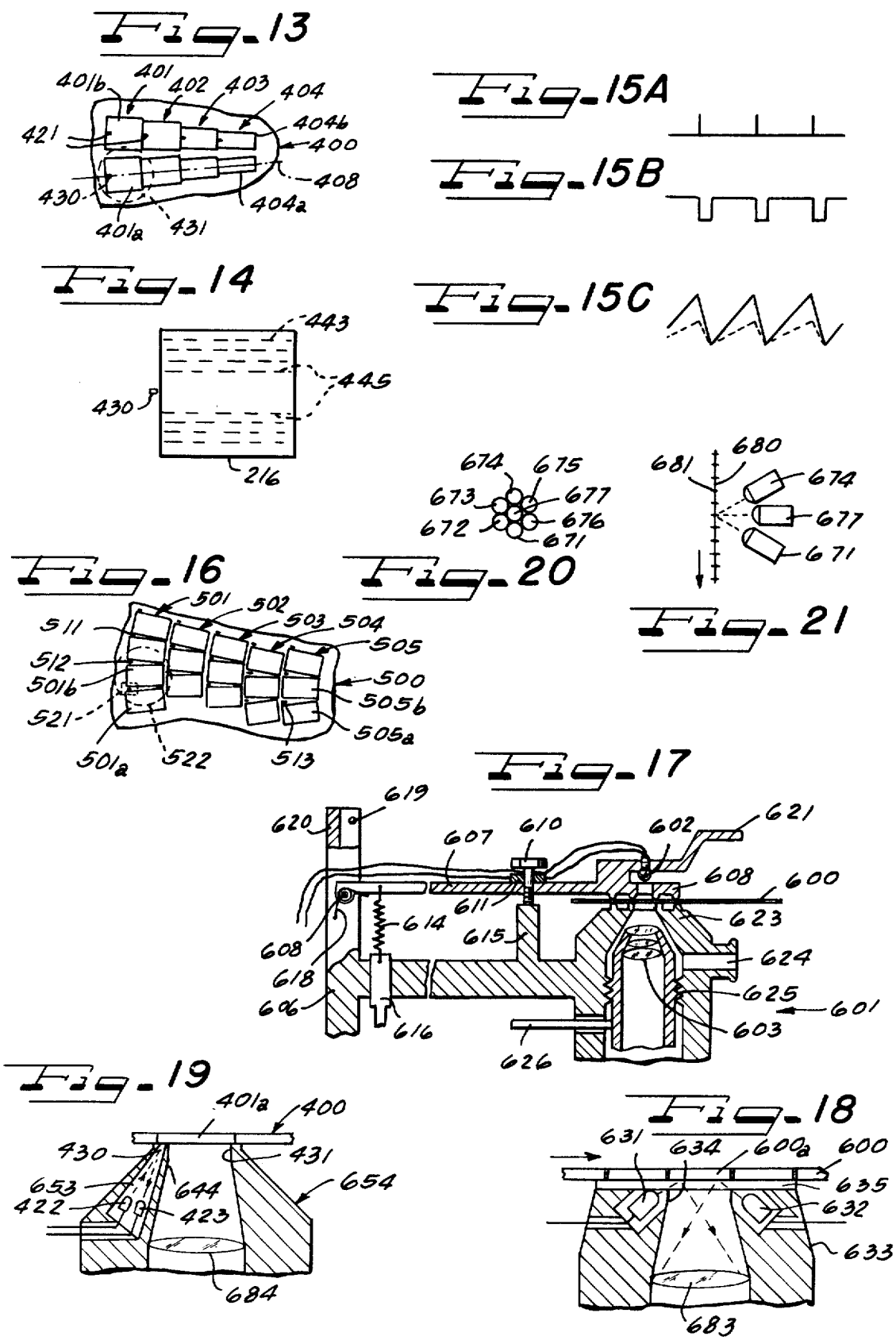

VIDEO DISC TRANSDUCER SYSTEM AND METHOD

CROSS-REFERENCE TO RELATED APPLICATION

This is a continuation, of application Ser. No. 826,054, filed Aug. 19, 1977, now abandoned which is a continuation-in-part of Ser. No. 519,340, filed Oct. 30, 1974, now abandoned.

SUMMARY OF THE INVENTION

This invention relates to a video record for a video transducer system and particularly to a video disc record and to a transducer system and method for transducing video signals recorded on such a disc record.

A disc format is ideal for mass produced video recordings that can be viewed and heard on a home television receiver. The advantage of such a format over tape include (1) rapid reproduction of desired recordings without delays for winding or rewinding between selections; (2) a more compact configuration; (3) a one piece unit construction which is of unique simplicity while yet exhibiting a substantial degree of ruggedness; and (4) reproduction on phonograph type equipment, including record changers, already familiar to consumers.

Video discs have been developed recently using serial recording of video information in the form of very fine modulated spots on a plastic disc, or as mechanically modulated grooves. Video contains so much information per second that such discs must run at high speeds such as 1800 revolutions per minute, and must have very fine tracks, for example 15,000 or more grooves per inch. These requirements demand such high precision and such sophistication. in the record itself, in the player, and in the duplicator, that the problems have not been solved, especially if the units are to be reliable and inexpensive.

It is an object of the present invention to provide a video disc system which avoids these limitations and is instead reproduced at a very low rate of rotation, for example that corresponding to scanning of one lineal inch of the recorded track per second.

In a preferred embodiment the disc record may comprise a eight or ten inch diameter disc with a succession of recorded images arranged along a spiral video record track having a substantial number of convolutions about the central axis, each convolution having a number of recorded images to provide a standard reproduced video frame rate for example thirty image frames per second during reproduction of the disc record while the disc rotates on its central axis at a rate of rotation corresponding to a lineal speed of the order of one inch per second. By way of example, one disc made in accordance with the preferred embodiment had a number of recorded image frames per convolution so as to provide a standard video frame rate when the disc record was rotated at about two revolutions per minute.

A further object of the invention is to provide a video disc record and transducer system particularly suited to providing video color signals for display on a home broadcast television receiver.

A feature of the invention resides for example, in a disc record with recorded images along a video track, with at least one control signal per image frame on a control track movable with the record. By scanning of the control track during rotation of the disc record, control signals are generated for use in regulating rotational speed so as to provide a desired reproduced video frame rate, and for keying the pulsing of a light source to the movement of the images to be illuminated thereby, for example.

Other objects, features and advantages of the present invention will be apparent from the following detailed description of the invention taken in conjunction with the accompanying drawings.

BRIEF DESCRIPTION OF THE DRAWINGS

FIG. 1 is a diagrammatic view of a disc record in accordance with the present invention and showing the helical video track and the corresponding helical sound track;

FIG. 1A is a fragmentary enlarged diagrammatic view of a portion of the spiral video record track of FIG. 1;

FIG. 1B is a fragmentary further enlarged view similar to FIG. 1A but diagrammatically indicating a series of recorded lines in the video record track and the alternative of a spiral sound or control track interlaced with the spiral video record track;

FIG. 1C is a view similar to FIG. 1B but indicating complete recorded image frames with associated control signals recorded on an adjacent interlaced spiral control track;

FIG. 2 is a somewhat diagrammatic plan view of a disc record transducing machine in accordance with the present invention;

FIG. 3 is a somewhat diagrammatic vertical sectional view showing further details of the machine of FIG. 2;

FIG. 4 is a diagrammatic view illustrating certain details of a playback transducer system for the transducing machine of FIGS. 2 and 3;

FIG. 5 shows a detailed electric circuit for triggering a solid state light source in an embodiment in accordance with FIG. 4;

FIG. 6 is a diagrammatic view illustrating further details of a playback transducer system for the transducing machine of FIGS. 2 and 3;

FIG. 7 is a diagrammatic top plan view illustrating a disc record in accordance with a further embodiment wherein the inner portion may be driven with a steady motion while the outer portion moves intermittently;

FIG. 8 is a diagrammatic elevational view showing a transducer system including the disc record of FIG. 7;

FIG. 9 is a diagrammatic vertical sectional view illustrating a modified disc record transducer system wherein each recorded image may be reproduced a plurality of times;

FIG. 10 shows a disc record for the system of FIG. 9 in successive playback positions;

FIG. 11 is a diagrammatic vertical sectional view of a further modified disc record transducer system wherein two channels of recorded information may be simultaneously reproduced;

FIG. 12A (on sheets one of the drawings) is an enlarged partial vertical sectional view showing one preferred arrangement for stable coupling of the video transducer head with a photographic type disc record;

FIG. 12B (on sheet one of the drawings) is a view similar to FIG. 12A, but showing a second preferred coupling arrangement;

FIG. 13 is a diagrammatic partial view of a disc record which is to be scanned at a constant rotational rate;

FIG. 14 is a diagrammatic view illustrating the manner in which recorded images of successively different size are projected onto the target of a vidicon such as indicated in FIG. 4 during reproduction of the record of FIG. 13;

FIG. 15 comprising FIGS. 15A, 15B and 15C, show wave forms relating to the reproduction of the record of FIG. 13 and relating to the changing scanning raster of FIG. 14;

FIG. 16 is a diagrammatic partial view of a disc record which is to be scanned with a constant track scanning speed;

FIG. 17 is a somewhat diagrammatic partial vertical sectional view illustrating certain preferred details for a playback scanning arrangement according to FIG. 4;

FIG. 18 is a partial vertical sectional view similar to FIG. 17 but taken parallel to the direction of movement of a video track on the record of FIG. 17, and illustrating a modified arrangement for illuminating the successive recorded images on the record;

FIG. 19 is a partial diagrammatic vertical sectional view similar to that shown in FIG. 17 but illustrating a modified gate assembly with control mark scanning means for scanning of the control marks of the record of FIG. 13;

FIG. 20 shows an array of light source elements for use in an embodiment such as illustrated in FIG. 4 and FIG. 17; and FIG. 21 is a diagrammatic sectional view illustrating the array of light elements of FIG. 20 directed toward a common image area on a record disc.

DETAILED DESCRIPTION OF THE PREFERRED EMBODIMENT

FIG. 1 illustrates a preferred disc record 10 in accordance with the present invention. The record 10 includes a central axis as indicated at 11 with a series of recorded images recorded along a spiral video record track as indicated at 12. As indicated in FIG. 1A, the recorded images such as 14-1, 14-2, 15-1, 15-2, 16-1 and 16-2 may be arranged sequentially with respect to a direction of movement of the record track as represented by arrow 18.

For the example where the successive recorded images such as 14-1 are recorded by scanning along a scanning line represented at 19, successive lines may be recorded as indicated at 21-1, 21-3, 21-5,-, 21-523, 21-525 in FIG. 1B and the individual recorded images such as 14-1 may represent sub-frames corresponding to a field of a video signal recorded on the disc. In this case, the next sub-frame 14-2 will contain lines 21-2, 21-4, 21-6,-, 21-522, 21-524 representing an interlaced field of the video signal, the sub-frames 14-1 and 14-2 together representing a recorded image frame corresponding to a frame of the video signal and to a single visual image.

With the arrangement illustrated in FIG. 1B, the direction of scanning represented by arrow 19 is transverse to the direction of record track movement represented by arrow 18, and the transverse direction with respect to each recorded image is the direction of maximum resolution, while the resolution between successive lines such as 21-1 and 21-3 corresponds to one-half of such maximum resolution, assuming the horizontal and vertical resolution of the video signal to be the same.

In each of the embodiments herein it is preferred that each recorded image such as 14-1 comprise an ordered plural dimensional spacial distribution of recorded image elements corresponding to respective ones of a plural dimensional array of elemental regions of a plural dimensional visual image. The image elements for example of two successive recorded images such as 14-1 and 14-2 correspond to a single visual image to provide a recorded image frame. The spiral video track moves at a low speed during recording so that the record track will have a number N of recorded image frames per lineal inch therealong where N is a number substantially greater than one, such as thirty. The image elements of successive recorded images preferably present a time sequence of said recorded image frames with a time span of T seconds per inch of the spiral video record track 12 such as to provide a reproduction frame rate N/T of substantially thirty frames per second with the disc rotating at a rate corresponding to a lineal speed in the direction of arrow 18 of the order of one inch per second.

As a specific example, the spiral video record track 12 may comprise a substantial number of convolutions or track sections such as indicated at 12-1, 12-2,-, 12-24, 12-25 encircling the central axis 11 with a density of twenty-five such convolutions per radial inch. If, for example, a center to center spacing between convolutions of about one millimeter (0.040 inch) is used, then three inches of record width would provide about seventy-five convolutions. If each convolution is about twenty-five inches long, and if relative movement in the direction of arrow 18 takes place at a linear speed of about one inch per second, then each convolution such as 12-1 gives a playing time of about twenty-five seconds, and seventy-five convolutions gives more than one-half hour of recording.

By way of example, the disc record 10 may have a silver emulsion layer with a succession of photographic or other images arranged along the spiral video record track 12. Common photographic emulsions are capable of two-hundred line pairs per millimeter resolution (usually referred to as 200 lines/mm) so that acceptable television quality is obtainable with a picture width of about one millimeter. Packing density can be increased by the use of finer grain media. Sensitivity is not too important once the master record is made, since duplication by printing need not have any relation to real time.

It has been found that most photographic emulsions used for picture taking are either coarse grained or of high contrast. A satisfactory film for preliminary work has been a fine grain positive film, Eastman Kodak type 7302, designed for printing from negatives but not recommended by the manufacturer for original photography. Special fine grained emulsions with resolution up to 2000 lines per millimeter are available, and for best results a custom made film compromising resolution, speed, and cost would be most suitable for the present preferred embodiment. Photo-sensitive materials not involving silver are practical, since slowness is not a criterion in duplicate prints. Alternatively mechanically formed images as by pressing or embossing may be used.

Preferably, referring to the illustrated embodiment, the recorded horizontal lines such as indicated at 21-1 and 21-3 are directly adjacent to one another on the disc 10 to form an essentially continuous image with respect to the direction 18 as well as with respect to the line scanning direction 19 (shown as radial to the disc central axis 11). By an essentially continuous image is meant an image such that if upon playback there is an error of scanning alignment or tilt, a continuous output is produced nevertheless by means of a line scanning type playback device. To accomplish this, the picture fields may be compressed with respect to the direction of lesser resolution, corresponding to the direction of arrow 18 in the illustrated embodiment, to one-half or less of the usual proportion relative to the line scanning direction. (The non-compressed normal aspect ratio would give a blank space between lines requiring careful scan alignment unless the lines were merged by a blurring of the picture resolution.)

In principle, only horizontal line deflection is required for a line type recording mode since the disc may be rotated slowly about its central axis 11 to provide the relative tangential movement represented by the directional arrow 18. In practice the addition of a controlled vertical scan has advantages in brightness, uniformity, and screen life. The transverse scanning line diagrammatically indicated at 19 in FIG. 2 may represent the coupling of a transducer device 20 with the video track 12. The light variations during the cyclical scanning along line 19 may be recorded. During playback, a light source such as indicated at 22 in FIGS. 2 and 3 may produce a light image corresponding to each recorded image such as 14-1 on a vidicon or other video camera device. The output from the video camera after amplification and equalization is a video signal that may be coupled into the video circuits of a black and white or color television set of the standard broadcast receiver type.

A spiral sound track 25 may be located radially inwardly of the video record track 12 and is conveniently produced by the same process as the picture recording. Thus, for example, the sound track 25 may be an optical sound track or a mechanical track which can be pressed or embossed along with the picture recording. A magnetic sound track, however, has been found to have the highest resolution with freedom from noise and distortion when the scanning is at low speeds (such as one inch per second), and for this reason, a magnetic sound track 25 is preferred for the illustrated embodiment where the disc 10 is to rotate at a rate of the order of two revolutions per minute, for example 2.4 revolutions per minute.

Further understanding of the construction of the preferred video record of FIG. 1 may be obtained from a consideration of the recording apparatus illustrated in FIGS. 2 and 3. For this example, record 10 is shown as being provided with a central aperture 10a with a driving notch 10b for receiving a driving hub 30 having a substantially cylindrical portion 30a of an outside diameter corresponding to the inside diameter of the aperture 10a. The hub is provided with a rounded or dome shaped upper face 30b for conveniently guiding the record 10 into engagement with the hub 30. Surrounding the hub 30 is an annular record support 31 having an upper annular surface 31a for flat-wise supporting engagement with an inner annular portion 10c of the record 10.

In the illustrated embodiment, the record 10 may be of relatively flexible material, and the diameter of the support 31 is sufficient to support the over-hanging annular portion of the record indicated at 10d in a relatively planar configuration as seen at the right in FIG. 3. For the illustrated embodiment, support 31 is integral with hub 30, and these parts together form a turntable generally designated by reference numeral 32 and including a central shaft 33 which mounts the turntable for rotation on its vertical central axis.

For the sake of illustration of a preferred arrangement, turntable 32 is shown as being mounted on a carriage 35, and the carriage is mounted by means of guide rollers 36–39 for displacement in a generally radial direction relative to the axis of the turntable so as to provide the pitch shown in FIG. 1 for the successive convolutions 12-1, 12-2,–, 12-24, 12-25, FIG. 1, of the spiral video record track 12 and such as shown at 25-1, 25-2,–, 25-24, 25-25 of the spiral sound track 25.

Referring to FIG. 2, a motor is indicated at 40 having an output shaft 41 for driving engagement with the periphery of a drive roll 42. If a single drive roll as 42 is used, the motor 40 should turn at about 60 RPM (revolutions per minute) which may be done by internal gearing. If an 1800 RPM motor is used, two sets of friction rolls in tandem can give the desired speed reduction. By way of example, the drive roll 42 may be in driving engagement with the cylindrical peripheral face 31b of support element 31 of turntable 32 so as to turn the turntable about its central axis. The motor 40 may be secured to carriage 35 for movement therewith while maintaining the drive coupling from motor shaft 41 to the periphery of drive roll 42 and from the periphery of drive roll 42 to the peripheral face 31b of turntable 32. The hub 30 of turntable 32 may include a drive key 44 engaging in the notch 10b so as to establish a precise angular relationship between the record 10 and the turntable 32 and to insure rotation of the record 10 with the turntable without any slippage. In the preferred embodiment this driving key 44 is arranged to be radially nonsymmetrical as shown in FIG. 2 such that the record 10 can only be placed on the turntable 32 with a predetermined side up; that is, the record cannot be placed on the turntable in its inverted orientation. Alternatively the turntable may be driven at a synchronous speed by positive gearing to the motor, or by a servo clutch or brake.

In the embodiment illustrated in FIG. 2, rollers 36 and 37 are constrained for movement along respective guideways 47 and 48, and rollers 38 and 39 are constrained for horizontal movement along respective guideways 49 and 50.

The means for driving the carriage 35 in a linear direction as determined by the guideways 47–50 is indicated as comprising gear teeth 55, FIG. 3, on a turntable shaft 33, which are in meshing relation with a gear 56, FIG. 2, on a threaded shaft indicated at 57. The shaft is rotatably mounted in suitable journals 58 and 59 secured to carriage 35. A cooperating half-nut 60 is shown as being carried on an arm 61 which is pivotally mounted to frame 63 at 64. A spring is indicated at 66 for urging the nut 60 upwardly into interengagement with the threaded portion of shaft 57. With the nut 60 interengaged with the threaded portion of shaft 57, during rotation of turntable 32, the threaded shaft 57 is rotated in a direction such as to move the carriage 35 from right to left as viewed in FIGS. 2 and 3. By way of example, an operating button is indicated at 70 in FIGS. 2 and 3 which is reciprocably carried on the carriage 35 and includes a depending leg 70a whose lower end rides along the mounting arm 61. Thus, at any longitudinal position of the carriage 35, the operating button 70 may be depressed against the action of spring 66 to disengage nut 60 from the threaded portion of shaft 57, whereupon by moving the button 70 to the right, while maintaining it depressed, the carriage 35 and associated parts may be returned to their initial rightmost position or to any other position for selecting a desired part of the record.

As indicated in FIG. 2, the carriage 35 may carry a pointer 80, and frame 63 may be provided with a cooperating scale 81 so as to represent the longitudinal position of carriage 35 and thus the relative elapsed time of a transducing operation.

In the illustrated embodiment, the transducer device 20 includes a video playback unit which replaces recording unit 85 and which cooperates with light source 22 during playback operation, and the transducer device 20 also includes a sound transducer unit 86.

Recordings may be made with the apparatus of FIGS. 2 and 3 in which case disc 10 may be made of Ektapan or fine grain 7302 film (obtained from Eastman Kodak). The turntable 32 may be rotated by means of drive motor 40 at a constant speed of approximately two revolutions per minute. The video recording system may include a cathode ray tube (CRT) 90 which is cyclically scanned along a vertical scan line on the face of tube 90 so as to produce a scanning beam as indicated at 91 which is directed toward the outer periphery of disc 10 by means of a mirror 92 and a lens system 93 of component 85. The arrangement is preferably such that the beam scans along the scanning line such as indicated at 19 which is disposed generally radially relative to the record 10, the disc rotating slowly in the direction of arrow 95, and the carriage 35 being driven along a linear path in the direction of arrow 96 so that the recording unit 85 scans the record along the spiral video record track 12, and the sound transducer unit 86 simultaneously scans along the spiral sound track 25.

For the case of recording a conventional demodulated broadcast television signal, the beam of the cathode ray tube 90 is deflected in synchronism with the horizontal sync rate of the video signal such that the beam traces substantially sixty interlaced fields per second along the video record track 12. If the lines recorded on the record 10 have a generally radial extent of one millimeter, and if the record track section moves at one inch per second, then one recorded field or recorded image such as indicated at 14-1 in FIG. 1B may have an extent in the tangential direction as represented by arrow 18 of 0.42 millimeter. This approximates a tangential extent of 0.375 millimeter which corresponds to a recorded aspect ratio of eight to three, rather than the normal television display aspect ratio of four to three. By compressing the recorded fields with respect to the tangential direction, the recorded lines essentially overlap such that during playback the proper signal amplitude is maintained even if scanning during playback takes place between recorded lines or in a slightly skewed direction relative to the recording direction. On a simple recorder where the rate of rotation (RPM) of the turntable 32 is constant, the tangential extent of recorded fields varies with the radius of the track; accordingly the value of such constant rate of rotation is chosen to give a good compromise of compression and picture sharpness.

Having produced a master record with a spiral video record track 12 and with the compressed recorded aspect ratio as here described, further records, may, of course, be produced by conventional photographic printing operations, for example, or by magnetic contact printing for magnetically recorded images, so that the reference numeral 10 may designate both an initially produced master record as produced by the apparatus of FIGS. 2 and 3, and subsequent prints produced from such a master record. An oversized master record and a reduction printer may be used for high resolution images.

As an alternative, the record may comprise complete recorded frames as indicated in FIG. 1C such as would be produced by scanning a single visual image with five-hundred and twenty-five sequential horizontal lines from top to bottom of the scene, for example; the corresponding recorded lines one through five-hundred and twenty-five being designated in FIG. 1C as 97-1, 97-2, 97-3, 97-4, 97-5,-, 97-524, 97-525. Where such complete frames are recorded with the apparatus of FIGS. 2 and 3, duplicate records may again be made by photographic printing operations or magnetic contact printing in which case successive recorded images such as indicated at 97 and 98 would each comprise a complete frame, and the number of such complete frames per lineal inch in the tangential direction of record track movement as represented by arrow 18 would be such as to reproduce thirty such complete frames per second having a 4 to 3 aspect ratio, for example.

For the case of recording of complete image frames, the recording device 85 may take a form of a cathode ray tube 90 with both horizontal and vertical deflection. In operation, the beam of the cathode ray tube 90 (which is rotated ninety degrees compared to a normal picture tube) would have its vertical scans as viewed in FIG. 3 taking place at the horizontal line rate, and its horizontal deflection controlled to scan interlaced fields with respect to each image area on the record. For example, if in a central position of the beam of the cathode ray tube 90, the beam scans along a radial line such as indicated at Y—Y relative to a spiral video record track 100, then the beam may first scan the odd numbered lines of the frame 97 beginning at line 97-1 as shown in FIG. 1C and continuing with the scanning of lines 97-3, 97-5, ..., the scanning line 19 defined by the beam progressively moving from the plane Y—Y to the plane Z—Z as indicated in FIG. 1C, so that the beam scans along record line 97-525 as this line coincides with the plane Z—Z. Then the beam is shifted to scan along a scanning line coincident with the plane X—X of FIG. 1C at a time when record line 97-2 is coincident with this plane X—X. The scanning beam then progresses from the plane X—X to the plane Y—Y scanning the even numbered record lines of frame 97 beginning with record line 97-2, then record line 97-4, and continuing to record line 97-524 which at the time of its scanning is substantially coincident with the plane Y—Y. The cycle then repeats with the scanning of record line 98-1 of frame 98 (this instant being represented in FIG. 1C) while this record line is coincident with the plane Y—Y, the beam moving from plane Y—Y to plane Z—Z in one sixtieth of a second, then rapidly moving to the plane X—X and scanning from the plane X—X to the plane Y—Y in the next one-sixtieth of a second. During the first one-sixtieth of a second, the record line 98-1 of frame 98 moves from the plane Y—Y to the plane X—X, and in the second field interval of one-sixtieth second, the record line 98-525 moves from the plane Z—Z to the plane Y—Y. It will be apparent therefore that the tangential distance between planes X—X and Z—Z should correspond to the maximum tangential extent of one recorded frame on the record track 100. The lines occurring during vertical blanking intervals need not be recorded on track 100.

For the example of a one millimeter width record track 100, and a constant scanning speed of the record track section of slightly under one inch per second (i.e. 0.89 inch per second), the tangential extent of a recorded frame such as 97 may be 0.75 millimeter so that the recorded line density with respect to the tangential direction conforms with a four to three aspect ratio. The showing of lines in FIGS. 1B and 1C is, of course, entirely diagrammatic since it would not serve a useful purpose to attempt to illustrate all of the individual recorded lines in these drawings. In FIG. 1C, the scanning pulses XX and ZZ are shown not quite parallel to plane YY, and the lines not recorded at plane Y—Y are also shown radial; but in a normal mode of recording with the apparatus shown in FIG. 3, such planes and lines would be essentially parallel. The path of the recorded scan, however, is modified by the motion of the record superposed on the motion of the scanning spot.

For the case of playback of complete recorded image frames, such as indicated at 97 and 98, FIG. 1C, the recording unit 85, FIG. 3, may be replaced by a vidicon or other video camera tube 85a, FIG. 4, such as to produce interlaced reproduced fields from each recorded image frame. With this mode of operation, the light source 22 is pulsed to flash each recorded image onto the target of vidicon 85a whereupon the scanning beam is deflected horizontally as well as vertically, the horizontal scans taking place radially of disc 10 at the horizontal line rate, and the vertical deflection being controlled to scan interlaced fields with respect to each recorded frame.

Vidicon 85a and objective 85b, FIG. 4, may replace unit 85, FIG. 3, during playback of the record of FIGS. 1A and 1B also, and in this case, the vidicon would not need to employ interlaced scanning but could scan each recorded image to generate a single video field signal, for example. For scanning of recorded field images such as 14-1 and 14-2, FIG. 1B, having an aspect ratio of eight to three, the electron beam would also utilize a scanning raster on target 216, FIG. 4, with an eight to three scanning raster. This corresponds to one-half the normal vertical deflection of the beam of a camera tube for a given horizontal raster dimension.

For the example of a one millimeter width record track 12, and a constant speed of the record track section 12 of slightly under one inch per second (i.e. about 0.89 inch per second), the tangential extent of a recorded field such as 14-1 may be about 0.375 millimeter so that the recorded line density with respect to the tangential direction is the same as for the example of FIG. 1C.

The recorded fields or frames of FIGS. 1A-1C may be of uniform size over the convolutions (such as 12-1 through 12-25) of the spiral video track 12 or 100, where the record is driven at a varying rotational rate to provide a constant track scanning speed, for example with the use of control marks 229 or 230 of constant tangential separation. The showing of lines in FIGS. 1B and 1C is, of course, entirely diagrammatic and lines occurring during vertical blanking intervals need not be actually recorded. In FIG. 1B, during playback, only a radially recorded line such as line No. 263 of an odd line field, and line No. 262 of an even line field would actually conform with the raster lines of target 216; but for a recorded field having dimensions of one millimeter radially and less than one-half millimeter tangentially, the error due to curvature of the track and radially recorded lines is very small. During playback of the record of FIG. 1C, a rectangular scanning raster with respect to target 216 essentially conforms with the substantially rectangular recorded frames produced during recording. That is, the recorded frames such as 97 and 98 are essentially of perfect rectangular shape where recording takes place between parallel planes XX, YY and ZZ, and where the minimum video track radius is say three inches. In such a case, the space between recorded frames will be appropriately wedge shaped.

For the case where a magnetic transducer head 110, FIG. 2, is utilized for recording the sound track 25, such head may have confronting poles defining a longitudinal gap 110a having a width in the radial direction of the record of somewhat less than one millimeter for example one-half millimeter. The pitch of the sound track convolutions preferably conforms with that of the video track, and may be twenty-five convolutions per inch, for example. The transducer device 20, FIG. 2, may mount the sound transducer gap 110a at a fixed distance such as indicated at 112 from the video scan line 19, so that each convolution of the sound track such as indicated at 25-1 in FIG. 2 is spaced a constant distance from the corresponding video track convolution or section such as indicated at 12-1. Further, it will be understood that a given segment of the video track such as that subtending the angle alpha in FIG. 2 has a portion of a video signal recorded thereon corresponding to the sound recorded on the sound track portion subtended by the same angle.

Where the magnetic transducer head 110 of the sound transducer unit 86 is utilized, the central annular portion 10c of the record 10 will have a magnetizable layer on its surface as indicated at 115. The layer 115 may be in the form of a smaller disc adhered to the picture disc during manufacture, or as indicated may comprise a magnetic coated area of the picture disc. As an alternative, the sound may be recorded on narrow tracks of magnetizable material interleaved with the picture tracks 12, such as indicated at 116 in FIG. 1B.

The sound transducer 86 may include a light source as indicated at 120 and a lens and photocell assembly 121 so that the unit of FIGS. 2 and 3 is also operative for playing optical sound tracks. The optical track may be produced by optical recording at the same time that the picture signal is recorded along the video track 12, or the optical sound track may be printed by photographic methods simultaneously with the printing of the photographic type video track 12 or 100. The optical sound track may be of the variable area type where the radial extent of the track recorded area is modulated in accordance with the sound signal at the central area 10c of the disc, or the optical sound track may be interleaved with the picture track at regions such as indicated at 116 and 117 in FIGS. 1B and 1C.

Similarly for the case of an embossed or cut mechanical sound track, the sound transducer unit 86 may include a phono stylus pick-up with the phono pick-up cooperating with a helical groove in the central region 10c of the record having the same pitch as the video record track 12. The phono pick-up could be carried in a self-centering groove-seeking mount. Alternatively, the sound groove could be presented in a small channel between convolutions of the video track at locations such as indicated at 116 and 117 in FIGS. 1B and 1C.

Further, of course, the sound may be recorded directly on the video track 12 by any suitable coding or multiplexing technique. Describing the transducer device 20 in further detail, it will be observed that the transducer device includes a mounting arm 130 pivotally secured by means of a hinge 131 to a fixed frame part 132. The pivotal arm 130 is shown as rigidly mounting light source 22 within a casing 134 and as rigidly carrying the sound transducer unit 86 including the optical sound unit 121 and the magnetic sound unit 110.

A backing element 140 is shown as being secured to the arm 130 at 141. The backing element 140 may be of a resilient metal and may be formed so as to have a free position extending at an angle a few degrees below its active horizontal position shown in FIG. 3. The backing 140 thus forms a cantilever spring for establishing stable pressure engagement between the backing or pressure applying means 140, the overhanging portion 10d of the record and a confronting surface 93a of the lens system 93, so that the scanning line indicated at 19, FIG. 2, will be maintained in accurately focused relation to the underside of the record 10 during operation. When it is desired to change records, the arm 130 is released to pivot about the hinge 131 and thus to lift backing element 140 clear of the record 110 so that the record can be conveniently removed and replaced. Hinge 131 preferably has a coil spring (not shown) associated with its pivot strong enough to lift the arm 130 away from the record against the force of gravity when the arm 130 is released.

It will be apparent that the transducer machine of FIGS. 2 and 3 may form part of a home broadcast television receiver, and be located therewith in a console, for example. In FIG. 3, however, a box-like housing is diagrammatically indicated at 150 having a pivotal cover 151 which may be of transparent material. The cover may be latched in the play position, shown in FIG. 3, and may have secured to it a compression spring as indicated at 153 of greater force than the hinge spring of hinge 131 so that the transducer head 110 is maintained in pressure contact with the record surface 115 until arm 130 is released by unlatching and opening the cover 151. Of course, any other suitable latching mechanism for retaining the parts in the play mode shown in FIG. 3 and releasing them to change records may be provided. The gate element 140 has a window or is of translucent material at the region 140a thereof so as to provide a light path through the gate from light source 22.

For the case where the video recorder unit 85 is of the optical type for producing a scanning line as indicated at 19, circuits component 160, FIG. 3, may be coupled with a broadcast television receiver via a line such as 161 for receiving a conventional demodulated composite video signal including horizontal and vertical sync pulses, and this video signal may be supplied to the control electrode of the tube 90 during recording operation to correspondingly modulate the intensity of the light beam produced at the scanning line 19, and thus for exposing the photographic type record 10 in accordance with a video signal to be recorded. At the same time, the sound channel or channels accompanying the video signal may be supplied to the sound transducer unit 86 for recording on one or more spiral sound tracks such as that indicated at 25. During recording operation, the horizontal sync signal of the video signal is supplied to a conventional sync separator and horizontal deflection circuits so as to generate the horizontal rate deflection current for magnetic deflection coils such as diagrammatically indicated at 162 and thus to cyclically deflect the beam along the scanning line 19 at the horizontal line rate of the video signal. The horizontal blanking signal conventionally may be applied to a control electrode where the composite video signal is applied to the cathode in a television receiver set, and this arrangement may be used in FIG. 3. Thus line 163 receives a horizontal blanking signal which is supplied to the control electrode of tube 90 to turn off the beam during its retrace intervals. For example, the circuits of component 160 may include a conventional automatic frequency control circuit so that the phase of the blanking pulses can be selected relative to the horizontal sync pulses of the composite signal. As an example of such adjustment, the blanking pulse to the control electrode and the retrace of the beam as determined by the deflection current to coils such as 162 may have a phase so that the horizontal and vertical sync pulses and all of the equalizing pulses are not recorded on the disc record 10. In this example the vertical blanking signal and the vertical deflection signal normally generated in a television receiver are generated by the circuit of component 160 during recording of a record as shown in FIG. 1B, so that the equalizing pulses, vertical sync pulse and horizontal sync pulses which occur during each vertical blanking interval will not be recorded during the thirteen to twenty-one lines of such interval. The brightness adjustment of tube 90 is of course determined so that the amplitude range of the video signal will be adequately recorded with sufficient contrast as compared to the unexposed portions of the record track, such that a conventional video signal is obtained with the use of light source 22 and camera tube 85a during playback.

In the playback mode, circuits component 85c, FIG. 4, will operate to supply the camera tube 85a so that an electron beam of constant intensity is scanned along the area of target 216, FIG. 4, and turned off during retrace intervals at the line and field rates. The horizontal deflection oscillator of circuits component 85c may be operated at substantially the horizontal sync rate of 15,750 cycles per second so that the proper line rate video signal is supplied from the camera tube 85a to the video circuits of component 85c. Line 165, FIG. 3, may include a connection with the sound transducers 110 and 121 for supplying reproduced sound to component 85c. During playback, motor 40 may be operated at the same constant speed as during recording, so that the reproduced frame rate is essentially thirty frames per second over the entire video record track 12. If desired, horizontal and/or vertical sync marks may be recorded or printed on the record 10 on an optical track such as indicated at 170 in FIG. 2, and the reproduced horizontal rate sync marks of track 170 may be supplied by the optical pick-up 121 so as to provide synchronizing pulses for insuring that the pulsing of light source 22 will be precisely related to the recorded images of the video track 12. It is desirable, however, to have a precise sync signal at the field rate supplied to a sync input 166, FIG. 4, and to utilize conventional video camera circuits to control scanning of the camera tube 85a and to supply the conventional composite video signal at output 167. The composite video signal from output 167, FIG. 4, and the reproduced sound signal or signals from magnetic transducer 110 may be supplied to the component 164, FIG. 3, for construction of a conventional television type signal meeting NTSC standards. The composite video signal may then be supplied to the RF circuits component 172 so as to modulate the radio frequency output which is shown as being supplied via a cable 174 and which may be coupled with the antenna circuit of a conventional broadcast television receiver. The radio frequency of oscillator component 172 would conform with an unused channel of the receiver, so that the reproduced video and sound signals could be received as modulated RF by the conventional receiver the same as a normal television signal.

The vertical sync signal from track 70, FIG. 2, or from track 117, FIG. 1c, may be compared with the output of a vertical rate reference input at 166, FIG. 4, to provide an error signal for servo control of the rate of rotation of turntable 32. The vertical reference oscillator of component 85c may be locked to the sync of a local sync source or to the separated vertical sync of a received commercial broadcast television signal, for example, as received at input 166. The turntable speed may be locked to the vertical reference frequency by controlling a servo clutch or brake associated with the turntable 32 to minimize any error in phase between the reproduced vertical rate control signals from track 117 or 170 and the vertical sync reference signals at 166. A brake 233 is illustrated in FIG. 6 for use in synchronizing turntable rotation with a vertical reference frequency at 166.

For a simple playback system, according to FIGS. 1A, 1B, 2, 3 and 4, the motor 40 is energized to effect rotation at substantially the speed corresponding to the recorded frame rate, the reproduced control signals from track 117 or 170 or from the recorded frame itself insuring that the pulse of light source 22 is at substantially the correct frame or field rate, and the reproduced composite signal is supplied via components 85c and 172 and line 174 to the antenna circuit of a conventional broadcast television receiver which is capable of being synchronized with the reproduced signals so as to accurately display the reproduced picture information. The sync might in this instance remain within plus or minus five percent of the standard recorded sync rates or within the lock in range of normal television sets.

A lever is indicated at 180 in FIG. 3 connected with the lens subassembly 181 of lens system 93. The subassembly 181 is threaded so that rotation thereof by means of lever 180 provides a fine longitudinal movement for adjustment of lens focus. A knob 182 is accessible externally of case 150 for actuating lever 180 so that focus can be adjusted during operation. A similar focus adjustment may be used with lens assembly 85b during playback.

DESCRIPTION OF FIGS. 4–6

FIG. 4 illustrates a preferred playback system for utilization in conjunction with record 10 of FIGS. 1, 1A and 1B, or FIG. 1C, and apparatus generally as illustrated in FIGS. 2 and 3. The record 10 may be mounted on a turntable 210 essentially conforming with turntable 31, FIGS. 2 and 3, and may be driven by means of a shaft having a vertical axis as indicated at 211 and essentially corresponding with shaft 33 of FIGS. 2 and 3. Gate mechanism 212 for precisely stabilizing the record 10 outwardly of turntable 210 may conform with the gate mechanism 93, 140 of FIG. 3, or may correspond to any of the other gate arrangements disclosed in the copending application Ser. No. 519,340. Instead of using a flying spot scanner such as indicated at 90 in FIG. 3 and a photocell in place of light source 22 as described in the copening application Ser. No. 519,340, FIG. 4 shows the use of a light sensitive target 216 of a video camera tube such as a vidicon as being selectively associated with the disc record 10 of FIG. 3. The components 85a, 85b may be substituted for components 85 of FIG. 3 in a playback only machine, or mirror 92 may be pivotally mounted so as to permit a light image of a recorded image on record 10 to be projected to the camera tube 85a during playback operation. The use of a flying spot scanner such as indicated at 90 for playback operation is considered to have disadvantages from the standpoint of cost, compactness, reliability and operating life in comparison to a camera tube such as vidicon 85a.

In FIG. 4, light source 22 is pulsed by means of a trigger circuit 215 which may include an adjustable delay for precisely adjusting the phase of the output pulse to light source 22 in relation to the vertical field signals at 166 which synchronize the deflection circuits 85c for the camera tube 85a. The light source 22 illuminates the entire recorded image, and may be pulsed, for example sixty times per second. Where the record 10 is being driven continuously, each light flash from source 22 may have a duration of approximately two milliseconds or less, and light source 22 may be off for the rest of each 16⅔ millisecond interval corresponding to a period of 1/60 second. The flash causes an electron-charge image of a recorded picture image to be produced on the target 216 of vidicon 85a. The charged target 216 inside the vidicon is scanned by an electron beam in the usual manner for video camera operation, the standard deflection and blanking signals being supplied by component 85c, and the output from the vidicon being processed by the video circuits of component 85c in the usual manner for a vidicon camera.

The phase of the triggering of light source 22 may be such that the light image from the record is transmitted to the vidicon target 216 during vertical blanking intervals of the vidicon deflection circuits. A new image is flashed onto the target 216 after the previous electron-charged image has been scanned. Where the record 10 moves continuously, each recorded image is correctly positioned in the gate 212 for only a brief instant, and the light source 22 is triggered to flash briefly at this instant. It might be thought that a flash of 1/100 of a second should stop movements as in conventional photography, but experiments show that the flash should be much shorter, less than two milliseconds and preferably less than 0.1 millisecond. Unlike conventional photography where the exposure may be quite long if the subject is not moving, continuously moving recorded field images may have a circumferential dimension of less than one millimeter, and may completely traverse the gate 212 in 1/60 second, for example, for the case of recorded image fields such as indicated at 14-1 and 14-2 in FIGS. 1A and 1B, and may traverse the gate 212 in 1/30 second for the case of complete recorded frames as indicated at 97 and 98 in FIG. 1C. Thus, regardless of the action in the moving scene represented by the successive recorded images on the record 10, and even if the scene is stationary, there will be about 12% vertical blur (two milliseconds/16.67 milliseconds) with a flash of 1/500 second (two milliseconds). It was found by experiment that this was about the upper limit of visual tolerance, not recommended for high quality, but used only to obtain the maximum usable light from a LED source of limited capacity. The apparently poor factor of 12% was probably improved by the shape of the light-output versus time characteristic and the response of the vidicon target 216. Where the light source 22 has sufficient capacity, its on-time should theoretically be 63.4 microseconds or about 1/16,000 second, in which time interval a recorded image will have moved a distance equal to the spacing between recorded lines such as 21-1 and 21-3 in FIG. 1B. For recorded images not based on a 525 line picture standard, the above times would be adjusted inversely as the number of recorded lines. In practice, an on-time of 0.1 millisecond has been found adequate. Shorter durations when available with sufficient intensity may improve the sharpness of the image still further.

Very short flashes lasting a fraction of a millisecond have been successful and may be synchronized to occur during the vertical or even during the horizontal blanking period, so that no part of the picture has excessive illumination. On the other hand, flash periods greater than 63.4 microseconds give a blending that may be advantageous in some cases, reducing dropouts, film grain, and the like.

The simplest light source 22 is a light emitting gallium arsenide diode (LED), flashed by a multivibrator circuit such as shown in FIG. 5. A Monsanto type MV 5020 LED has given good results but its output is limited, and a stronger source is desirable. Conventional light emitting diodes give a bright emission when energized from a direct current source but must be de-rated to a small fraction of this emission when used in a low duty cycle as about 12% on-time in the marginal case, and 63.4/16,667 equals 0.0038 equals 0.4% on-time in a preferred case. An efficient heat sink is required so that the high currents during the short intervals will not raise the temperature of the active element enough to cause deteriorzation. It appears that the brightness remains proportional to the current even at momentary currents of ten amperes or more in the MV 5020 type LED, if the peak heat dissipation is taken care of. To increase the illumination, a multiplicity of light sources such as the MV 5020 LED lamps may be simultaneously directed on the picture at the gate. FIG. 18 shows a pair of such sources, but a multiple cluster as for example seven sources may be used as in FIG. 20. A circuit as FIG. 5 can be used, substituting multiple LED's connected in series in place of the single LED shown. The B+ voltage is then increased to supply the additional voltage drop across each additional LED, and the 56 K and 5.6 K base resistors increased accordingly. A 470 ohm resistor can be placed across each LED. Multiple LED's can alternatively be connected in parallel across the LED in FIG. 5, in which case the 10 ohm resistor at the collector of the 2N3055 is reduced to allow increased current, and/or higher current rated transistors are substituted.

Very high light output and very short duration may be obtained with xenon flash tubes such as used for strobe lamps, but this is more expensive than the simple LED source. For example, a strobe light with a flash duration of 0.8 microsecond and 200,000 beam candles output as in the General Radio Model 1538A or 1531AB Strobotac gave excellent reproduction of recorded images.

With interlaced scanning and 262.5 lines per recorded image field as in FIG. 1B, even if light source 22 has a 126 microsecond flash duration, adjacent recorded lines would be scanned by vidicon 85a without blurring, where the recorded lines such as 21-1 and 21-3 had a spacing corresponding to the normal aspect ratio of four to three.

Still pictures are readily shown with the system of FIG. 4, merely by stopping the rotation of the disc 10 with a recorded image such as 14-1, FIG. 1B or 97, FIG. 1C, positioned within the gate 212 for repeated projection onto the target 216. Whatever recorded picture field is in the aperture of gate 212 is continually renewed on the target 216 by a flash of light source 22 every 1/60 second. The disc 10 may be indexed to display any other recorded image, or may be moved slowly for slow motion effects.

A versatile arrangement for slow motion or for long playtime on a given disc utilizes an intermittent motion of the disc drive. Each recorded picture image such as 14-1, 14-2, FIG. 1B, or 97, 98, FIG. 1C, is held stationary in the gate 212 for two flashes of light source 22 if half-speed motion is desired, or for three flashes of light source 22 if ⅓ speed motion is desired, and so on. The disc is then moved rapidly to position the next recorded picture image at gate 212 where it remains stationary while similarly flashed several times before a further indexing of the disc. For NTSC standards, sixty flashes per second are used. If the disc has been recorded with the normal sixty recorded field images per second, it would only progress at a twenty field image per second rate when each picture was flashed three times for slow motion. On the other hand, if the disc was recorded with every third field image that occured in real time, while every first and second field was discarded, then the action would take place at normal speed when flashed three times per recorded field image. With only twenty different recorded field images per second instead of sixty, the disc record 10 would revolve at one-third the speed and its playing time would be tripled. A recording with fifteen different pictures or recorded images per second each flashed four times before the record is indexed to the next recorded image is adequate, being comparable to the silent movie standard of sixteen frames per second. The playing time in this case is quadrupled, so that a half hour disc record (when used with sixty different fields per second) can hold a two hour program at the fifteen different field per second economy rate. Even greater ratios are possible in special cases.

Intermittent motion for the disc record can be mechanically arranged by a claw and sprocket drive comparable to that used for motion picture film, the sprocket holes being in a circle at the outer edge 218 of the disc record 10 as in FIG. 7. Alternatively, the sprocket holes can be at periphery 219 of the turntable 210, located for example under the outer rim of the turntable. Where the turntable 210 is intermittently driven, it should have the least possible inertia, and be made of lightweight material. An electromagnetic drive using a printed circuit motor or a stepping motor is an alternative which is advantageous in not having parts subject to severe mechanical wearing.

FIG. 6 shows a method for locking turntable 210 so that approximately 59.94+ fields per second are presented to the scanner 85a, 59.94+ being the NTSC standard for color signals. The frequency standard as selected by switch 221 may be a local crystal oscillator or tuning fork as indicated by component 222, or may be a frequency derived from a broadcast receiver as indicated by component 223, or may be a sixth cycle signal derived from the alternating current power line as indicated by component 224. Where component 223 is utilized, the frequency standard is, of course, derived from a broadcast receiver and the standard is that of the broadcasting station. The signal at input 166 is supplied to a comparator component 226 and may be compared with a signal picked up by a photocell 227 from markings such as indicated at 230 in FIG. 1C, on the disc record 10 being played back. With switch 230' in an alternate position, markings on the underside of turntable 210 may be picked up by photocell 231 and supplied to comparator 226. The comparator 226 regulates the servocontrol component 232 to adjust the turntable speed by means of a brake 233 acting on the turntable rim 219. Alternatively or additionally, servocontrol 232 may control motor 236 via switch 237.

With switch 230' in the position shown, when the frequency of the signal from pickup 227 is equal to that of the standard introduced at input 166, then the servocontrol 232 will not alter the speed of motor 236; otherwise it supplies a correction signal to increase or decrease the motor speed, depending on whether the frequency from pickup 227 is lower or higher than the input standard at 166. Short term fluctuations are simultaneously corrected by brake 233 or equivalent.

With turntable 210 being movable relative to a stationary gate 212 as illustrated in FIGS. 2 and 3, the photodetector 227 and light source 238 can also be stationary. The vertical sync marks on the record 10 can simply be the bars between recorded field images, for example at lines such as 21-523 and 21-525 and other recorded lines during the vertical blanking interval in FIG. 1B, recorded at an extra high intensity. Alternatively, an auxiliary narrow track such as 116 in FIG. 1B or 117 in FIG. 1C can be provided between the picture tracks in which case one or more vertical sync marks or control signals such as indicated at 229, FIG. 1B, and at 230, FIG. 1C, can be recorded for each recorded picture field image such as 14-1 or for each recorded picture frame image such as 97, FIG. 1C. Multiple marks per rounded field or frame image give finer control, and would be compared in the comparator 226 with a standard of higher frequency at 166 by the appropriate multiple. A distinctive marking once per recorded field image as shown at 229a, 229b, 229c, FIG. 1B, and once per recorded frame image as shown in FIG. 1C at 220a, 230b, 230c is desirable to give positive locking. FIG. 1C shows recorded frames such as 97 and 98, each having four associated control marks 230. Similarly, four control marks 229 per recorded field may be applied to track 116 in FIG. 1B.

Where the recorded picture frames such as 97 and 98 or the recorded field images such as 14-1 through 16-2, FIG. 1A, are recorded with equal tangential extent, the turntable 210 will be speeded up by the control system as the inner convolution of video track 12 are presented, since the control marks such as 230 will have equal spacing over all of the convolutions of the control track 116 or 117. The control system of FIG. 6 is thus adapted to maintain a constant linear track speed of the recorded images through the gate 212.

For the case where the recorded images are recorded at constant angular velocity of the record 10, then the control system of FIG. 6 will maintain this constant angular velocity during playback. Thus, regardless of the scanning speed as a function of radial distance during recording, the playback system will maintain such speed as a function of radial distance, and also correct for deviations and fluctuations from smooth motion.

With switch 230 in its opposite position, photodetector 231 will respond to marks on the lower portion of the turntable 210 which can be arranged as a spiral or in concentric circles.

If source 240 and photocell 231 are stationary while the turntable 240 moves radially as shown in FIGS. 2 and 3, then the control marks can be equally spaced along a spiral path to maintain a constant linear track scanning speed during playback, the angular velocity of the turntable 210 increasing when the inner portion of the record 10 is being scanned at gate 212. Any other velocity as a function of radial distance function can be chosen. On the other hand, photocell 231 and source 240 can move together with the turntable 210, picking up a fixed ring of equally spaced control marks on the bottom of turntable 210 and maintaining constant angular velocity during scanning of the successive convolutions of the video track 12. Several fixed rings of equally spaced sync marks with different radial distances from the axis 211 can be provided on the bottom of turntable 210 with shifting of source 240 and photocell 231 or the like so as to select one of the rings and a corresponding respective different constant rotational rate during playback.

Where complete frames are printed on the record 10 such as indicated at FIG. 1C, it may be desired to use frames of equal tangential extent over the entire length of the video record track, and utilize frame sync marks along a spiral sync track such as indicated at 170 in FIG. 2 to precisely control the initiation of the pulsing of the light source 22. In producing successive completion frames as shown in FIG. 1C, the frames can be printed from movie film or the like, by focusing the successive frames at successive locations along the video record track 12 by essentially conventional procedures. As just explained, the successive recorded frames may be of equal tangential extent, and may be recorded with rectilinear margins, and with a tangential extent equal to the spacing between the parallel scan lines X-X and Z-Z in FIG. 1C, the lines X-X and Z-Z being practically parallel with the line Y-Y in this example. For the case of complete frames, each frame may have a rectilinear configuration with a generally radial center line dimension corresponding to Y-Y of one millimeter and a tangential extent at right angles to such line Y-Y of three-fourths millimeter to provide the conventional four to three aspect ratio for the recorded frames. A constant track speed may be obtained by servo control of the turntable as explained with reference to FIG. 6. Alternatively the tangential extent of each frame may be decreased in proportion to the radius as the tracks spiral inwards.

Instead of recording the images of any of the embodiments on a spiral video track, the successive images may be recorded along successive circular paths with radial shifting from one arcuate path or track to the next at a given point. The transition from one arcuate path to the next may include a substantial tangential component to provide for scanning of recorded images during the transition from one constant radius portion to the next constant radius portion. As a further alternative, a series of circular tracks may be provided. With either alternatives any track may be selected and repeatedly reproduced as long as desired. The frames may represent blocks of data rather than visual images of a pictorial nature. While thirty frames per second conforms with the conventional U.S. broadcast standard, European television uses twenty-five frames per second, and there are other possible standards, for example for high resolution closed circuit television systems and the like. While a figure of one inch per second has been given as a typical speed along the video track for the example illustrated, the speed may vary continuously as a function of the radial distance from the axis 11, and the audio transducing speed may be of the order of one-half inch per second and also continuously vary as a function of radial distance from the central axis, where the disc rotates at constant speed during recording operation, for example. Where optical frames are recorded or printed on the record, such frames may be scanned while the disc is stationary, with indexing of the disc to scan successive complete frames, for example (intermittent movement). Alternatively, a shutter, or a synchronized tangential component of movement of the reproducing beam may be provided. A solid state line scanner may be utilized to scan along the scanning line 19, or a cathode ray tube type scanner such as 90 may be used during playback.

A disc made of color film or color positive paper may be provided with images in their true colors, or with negative color images as on Kodacolor negatives. These are played back with a color camera tube such as 85a or its equivalent. Alternatively a white flying spot scanner (such as scanner 90) is used, and the output light during scanning is viewed by three (for example) photocells each with a filter to make it respond to a different primary color.

As a further alternative, the color may be coded onto the black and white picture images by superimposing a horizontal scan modulation with a different (high) frequency fine shading or sectioning of this image for modulating a horizontal scan assigned to each primary color. For example green may have 2.5 megahertz modulation, red may be assigned a 3.5 megahertz rate and blue may be assigned a 3 megahertz rate.

As a third alternative, alternate lines or frames of the picture recorded images may bear the color information. The color line or frame is scanned "silently" (without the resultant electric signal being displayed on the display screen by itself) while a correct image is displayed either from a parallel picture or from a series interposed picture. The series interposed picture uses another simultaneous scanner and a stepping system, or an information storage device which holds and repeats a line or a field (or frame).

As a fourth alternative for color transducing, multiple black and white images can be recorded in parallel, each one with the information of a different color. The radially aligned fields or frames on the record representing the respective colors (3 for example) are scanned simultaneously, and each one picked up by a separate photosensor that activates the corresponding color circuit.

Each of the embodiments given herein is disclosed as using each of the sound track configurations herein disclosed. Contact printing is preferred for producing optical or magnetic sound tracks. A mechanical sound track may be formed by pressing.

A low cost player may project complete recorded image frames such as indicated at FIG. 1C directly on a screen so that a television set and scan converter are unnecessary. See U.S. Pat. No. 2,005,914 issued June 25, 1935. A stepping motor drive for the record disc, for example, may provide frame by frame projection. An intermittent drive of this kind may be used in conjunction with a shutter to block out the transition between frames. As a third alternative, an optical rectifier may be utilized with a continuously rotating disc. Still further, the complete recorded frames such as described with respect to FIG. 1C in any of the forms herein given, may be utilized with a light source and lens system for focusing each successive frame on a vidicon or other type of television camera system. With each image focused on the camera, the image can be converted to a video signal with conventional television techniques; any image device such as a plumbicon, image orthicon, or the like may be utilized. Color images and a color camera are usable. If continuous motion of the record is used rather than intermittent motion, the camera tube is scanned along a line in the horizontal direction only, the vertical scan being supplied by motion of the disc, for example; or the directions of scan can be interchanged if the pictures are scanned in a non standard manner as in transverse or tangential direction. If an intermittent drive and shutter are used, then the camera tube can be used with both vertical and horizontal scanning. With a flying spot scanner, both vertical and horizontal scanning is feasible if an intermittent drive is used. The transition intervals can be blanked out.

An opaque disc system may be utilized with video and sound tracks on both sides of the disc, if desired. Any of the configurations described herein can be applied to both of the sides of the disc, to increase the program capacity. An opaque record can be provided with printing processes that are used on paper or the like to provide a low cost record. Solid state linear scanners using integrated circuit techniques can provide very small and very thin lines for direct scanning, or a larger line source can be reduced to the size of the desired frame, with a lens system or fiber optics. Servo or digital systems can be provided for operating a shutter or the equivalent from the frame track such as indicated at 170 or the equivalent. Speed control of the disc is feasible according to the frame rate with the frame signals such as indicated at 170 having an equal tangential spacing, for example. The disc would then slow down while scanning the outer convolution such as indicated at 12-1 at the outer periphery of the spiral so as to give a constant tangential speed in the direction of arrow 18 over the entire extent of the recorded video track. By using an objective (lens system) having a shallow depth of field, recordings can be used on both sides of a transparent disc without interfering with one another. For example an objective of 8 mm or shorter focal length with a numerical aperture of 0.5 or higher has a depth of focus of a few microns, while a record disc may be 125 microns thick. In this case, if the focus is set for images on the far side of the record (away from the objective) then the near layer will be so far out of focus that it will not register, especially if the spiral tracks correspond with each other (one spiral being played in reverse when the record is turned over). Alternatively the record need not be turned over, but the lens may be changed to focus on whichever recording is desired. Extending this concept, a record with a thick emulsion may have many recorded planes each one selected by refocussing an objective of very shallow depth of field. A record changer thus has to change the focus only and one record can have an album of recordings on it.

Further features of the invention reside in a disc with two related sets of tracks one adjacent the periphery and the other adjacent the inner portion, for simultaneous scanning, apparatus for above, and a disc drive where a substantial portion of the disc periphery overhangs the drive, having part of its recording on the overhanging portion, and a record related part on the inner portion, both being scanned simultaneously, for example.

In each of the embodiments, recording is preferably carried out under darkroom conditions except that a safelight can be used if the films are not sensitive to reds and orages. A film pack can be used for daylight recordings on a specially designed turntable with a light tight enclosure.

For playback it is sufficient to exclude external light at the light source 22, which can be done by a ring black velvet extending from the lower edge of the source housing 134, FIG. 3, and riding against the record. Similarly the lens system 93, FIG. 3, or 85b, FIG. 4, can be shielded at the record. The path from the cathode ray scan tube 90 to the lens system 93, FIG. 3, is also easily shielded from external light.

DESCRIPTION OF FIGS. 7 AND 8.

FIGS. 7 and 8 show a transducer system which may generally correspond to that of FIGS. 4, 5 and 6.

FIG. 7 shows a disc record 260 having a central mounting aperture 261, an outer picture portion 262 with equally spaced sprocket holes or slots 263 and an inner sound portion 265 separated from the picture portion 262 by a flexible region 266 illustrated as comprising a series of very flexible spokes 267. The picture portion 262 may have a series of equal size recorded picture frame images uniformly spaced about a spiral video track 270, or an equal number of images per turn of spiral corresponding to the sprocket holes, while the sound portion 265 may have a spiral sound track with the same number of convolutions as the video track 270, the audio having the same time span and referring to the same scene as the video track.

As shown in FIG. 8, an intermittent drive 274 may control movement of the picture portion 262, such drive for example comprising a stepping motor with damping means to prevent undue oscillation during rapid stopping. Alternatively a tooth and claw mechanism may be utilized as in motion picture cameras. The light source such as 22, FIG. 4, may be flashed several times while a given picture image of track 270 is aligned with vidicon 85a, so that several complete scans of each recorded image may be carried out by the vidicon 85a.

A constant speed stable drive is indicated for the sound portion 265, this portion being supported on a turntable 280 having a shaft 281 with a flywheel 282. The constant speed drive may include a drive belt 283 so that the recorded sound tracks 271 move continuously at a constant rotational rate for scanning by means of a sound transducer such as indicated at 110 or 121 in FIG. 3. Alternatively, the turntable 280 may be provided with a spiral control track with equally spaced control marks thereon, and a servo drive including a photocell such as 231, FIG. 6, may be utilized to drive the sound portion 265 with a constant track scanning speed, the rotational rate of the sound portion 265 progressively increasing as the sound scanning head moves radially progressively toward the central axis of the disc. While the picture portion 262 thus has a different instantaneous velocity in comparison to the track scanning velocity of the sound portion 265, the picture track 270 and the sound track 271 are still scanned each with its own average track scanning velocity so that the video scene as reproduced from the record is synchronized with the reproduced sound track. Thus, for the case of a sound portion 265 which is rotated at a constant rotational rate, the picture portion 262 will exhibit the same average rotational rate as the sound portion. For the case of a constant sound track scanning speed, there will also be a constant average video track scanning speed which will be higher than the sound track scanning speed in proportion to the differences in radial distances of the sound scanning head and the video scanning head during transducing operation.

As an alternative to continuous movement of the sound portion 265, the entire record may be moved intermittently by means of the drive 274, in which case the flexible coupling region 266 is replaced by a solid connection. Here, the sound may be recorded digitally in which case the digits can be read during intermittent motion, stored in a buffer memory, and read out of the buffer at a steady rate, free of any flutter, and synchronized with the video reproduced signal.

DESCRIPTION OF FIGS. 9-11

FIG. 9 illustrates a disc record transducer arrangement similar to that of FIGS. 4-6 but provided with a target 216a, light sources 22a and 22b and lenses 290 and 291 for focusing light images of successive images on a record 292 onto the target 216a. Referring to FIG. 10, with recorded image x aligned with light source 22a, a flashing of light source 22a produces an electron image of recorded image x on the target 216a for scanning by means of a vidicon arrangement such as indicated at 85a. After the lapse of a frame or field interval, the recorded image x will overlie light source 22b, so that when this light source is flashed, a corresponding electron image will be produced on target 216a for electronic scanning as before. Subsequently, recorded image y will overlie light source 22a which is flashed to produce a readout of recorded image y. Thus, spaced recorded images such as x and y on the record 292 are each read out twice. Alternate recorded images may be recorded between successive recorded images such as x and y so as to provide another selectable recording, or another reading system can be provided for simultaneously reproducing the alternate recorded images.

FIG. 11 shows light sources such as 22a and 22b associated with respective targets 294 and 295 of respective vidicon tubes such as 85a. With this arrangement successive recorded images such as x and x' are simultaneously transferred to targets 294 and 295 for simultaneous scanning and reproduction. The next flash transfers x' and y, the next transfers y and y', etc. By electronically switching the outputs of the vidicons associated with targets 294 and 295 interchanging the respective video output channels after each flash by means of flash and switch control 296, FIG. 11, a first channel may receive two reproduced video signals corresponding to the x frame, then two reproduced video signals corresponding to the y frame in the same way as for the example of FIG. 9, while the second video channel will correspondingly receive two reproduced video signals according to the x' frame, then two reproduced video signal portions according to the y' frame and so on. The two channels may thus receive two separate video signals, or one channel may receive the luminance information for a given color television signal, while the second channel may receive the chrominance information with respect to the same color television signal. The strobe rate of the sources 22a and 22b is twice as high as for an ordinary sequence, reducing flicker. Thus, if the x, y . . . series has thirty pictures per second passing continuously through the gate, there will be sixty pictures of this series strobed and scanned per second, each one twice. At the same time there will also be sixty pictures of the x', y' . . . series strobed and scanned per second appearing in the other channel.

DESCRIPTION OF FIGS. 12A AND 12B

FIG. 12A shows a radial sectional view at the video transducer-disc record coupling region, so as to illustrate a record contacting upper end 303 for the lens system 93 of a first preferred configuration. In this embodiment, the end 303 is provided with a series of elongated ribs 304–307 for engaging the emulsion side of a photographic type disc record 10 along narrow arcuate segments of the record 10 which are between the recorded images. For example if the images having a radial center to center spacing of one millimeter, the ribs 304–307 may have a radial center to center spacing of one millimeter and the actual recorded image may have a useful radial extent of slightly less than one millimeter, so that the ribs 304–307 do not contact the useful portion of the recorded images on the record track 12. The ribs 304–307 may thus contact the disc record at marginal portions corresponding to the undersides of respective convolutions of the sound track 116, FIG. 1B, or 117, FIG. 1C. Since the curvature of the successive convolutions varies with their radial distance from axis 11, the ribs 304–307 will be of limited extent in the circumferential direction relative to the record and will have an intermediate curvature such that during their tracking along the margins of the video record track, they will not contact the useful radial extent of the recorded images. Generally, any contact with the actual picture portions of a photographic type disc record 10 is undesirable, and this is especially true of sliding contact. Additional auxiliary ribs may be provided at one millimeter centers so as to distribute the pressure of the end 303 of the lens system on the record 10 to the extent desired. Each of the ribs such as 304–307 may be of arcuate configuration corresponding to the mean curvature of the video record track 12, so as to substantially conform with the arcuate margins or boundaries of the successive convolutions of the video record track over the full extent thereof.

In the embodiment of FIG. 12A, a cantilever spring 140′ carries an annular pad 310 of felt or the like. The spring 140′ may have the same free configuration as gate element 140 so as to provide a spring bias on the pad 310 when the spring 140′ is held in a horizontal orientation. The annular pad 310 may include a thin layer of smooth material with a low coefficient of friction such as Mylar as indicated at 311. The layer 311 may be transparent or may be provided with a central aperture conforming with the aperture 312 in pad 310 and aperture 313 in spring 140′, and its undersurface will be in sliding pressure engagement with the upper surface of record disc 10. The aperture 314 in end 303 of the lens system of the video transducer and the aligned apertures such as 312 and 313 in the pressure applying means 140′, 310 and 311 provide a light path for light from the cathode ray tube 90 to the disc record 10 during recording, and from the light source 22 to target 216, FIG. 4, during playback operation.

FIG. 12B shows a second preferred embodiment wherein an end 320 of the lens system of the video transducer is provided with a cylindrical wall 321 with a transparent end 322 aligned with opening 323 in end 320 for transmitting light from the cathode ray tube 90 and the lens system to the record 10 during recording operation. A cantilever spring is shown at 140″ for applying downward pressure on a pad 324 which engages the upper side of the record 10. The interior wall 320a of end 320 and the cylindrical wall 321 form an air chamber 325. Air is supplied under a regulated pressure to the chamber 325 from an air conduit 326 so as to establish an air stream flowing through aperture 323 and against the underside of disc record 10. The air pressure in chamber 325 is maintained at a value which holds the emulsion side of disc record 10 clear of detrimental contact with the end 320 of the lens system. The air pressure in chamber 325 may be regulated to maintain the scanning beam focused on the underside of disc record 10. An adjustable pressure relief valve and pressure indicator device 327 is shown in FIG. 12B to represent the control of pressure for these purposes. The element 140″, 324 at the back of the disc 10 (the upper side in FIG. 12B) may be omitted since the air flow from opening 323 can be adjusted to maintain focus without a physical backing element on the side opposite the side on which the air stream impinges. Alternatively the pressure in chamber 325 may be below atmosphere pressure to position the record at the optimum focal point.

By way of example, the magnetic transducer head 110 may be of the ring type with confronting pole pieces separated by a gap spacer material which defines the coupling gap 110a. The gap 110a may be disposed in the same radial plane as the scanning line 19 as shown in FIG. 2. The poles of the magnetic transducer head have a width equal to the width of the sound track and may be in pressure engagement with the surface 115 of the magnetizable layer by virtue of the action of spring 153, FIG. 3.

The reading of indicator 327 responds to the air flow through opening 323 and is useful for indicating the distance of film 10 from this opening, especially if the air supply has a high "internal resistance characteristic". Indicator 327 is therefore mounted where it can be read easily, as for example outside of the case. The air supply is preferably filtered and may be generated by a simple pump or blower on the drive motor for the turntable, with an external adjustment as for example a needle value to set the film distance to the desired focal point.

The control of current to deflection coils 191 and 192 to shift the scanning line 19 in the tangential direction from YY to ZZ during recording of odd numbered lines is analogous to vertical deflection in a television receiver except that the deflection is one-half what would be required if the record were stationary. Similarly the deflection of the scanning line from XX to YY during even field intervals is closely analogous to conventional vertical deflection in television receivers, and this type of deflection is readily implemented by those skilled in the art. For example, a bistable circuit may respond to vertical sync pulses and supply an additional deflection current to coils 191 and 192 during even field intervals, so that deflection begins at XX rather than at YY during such even field intervals. The vertical blanking signals are generated by the vertical reference oscillator in component 160 in this example and are used to turn off the beam as it retraces from ZZ to XX. The vertical blanking signal may be blocked by the aforementioned bistable circuit between frames so that vertical sync signals are recorded in these intervals with extra intensity as compared to a block image portion. The vertical oscillator may be controlled by the separated vertical sync from the video signal being recorded for recording operation and synchronized as previously explained during playback.

With the embodiment of FIG. 1C, during recording, therefore, the horizontal sync pulses and the equalizing pulses may be recorded on the record track 100 except during retrace from ZZ to XX (which might require fifteen horizontal line intervals per frame, for example). Generally a momentary loss of horizontal sync pulses between interlaced fields from the reproduced signal would not prevent generation of a complete composite signal at component 85c, as the lost pulses can be inserted by a timing oscillator. The reproduced image rate control pulses from the photocell 227, FIG. 6, and corresponding to marks 230a, 230b, 230c, etc., FIG. 1C, can be compared with the output of the reference oscillator 222 to generate an error signal used to lock the speed of rotation of the turntable 210 to the vertical reference oscillator, and the vertical reference oscillator can control generation of the conventional vertical blanking waveform for the composite video signal to be supplied to component 172 of FIG. 3. The sync generators of the vidicon 85a may operate at 15,750 horizontal deflections per second and at a field rate of sixty interlaced fields per second locked to reference oscillator 222, these values being according to the NTSC monochrome standard (or slightly modified values may be used conforming to the NTSC color standard). The record speed may then be adjusted to maintain or lock in its pictures to the vertical sync rate of the reference oscillator 222; or alternatively the sync generators may have their frequency modified slightly by a control to keep the vertical sync locked to the image rate presented by the record. Both the disc speed and the vertical sync rate may be locked to the nominal 60 cycle line frequency of component 224 so that they remain together, while the horizontal rate of vidicon 85a is preferably adjusted for 262.5 times the vertical field rate of the vidicon, although it may depart from this rate with some degradation of interlacing.

The output of the horizontal and vertical oscillators of vidicon 85a are thus locked to the phase of the light images flashed onto target 216, and these oscillators may thus supply horizontal and vertical blanking signals for the reproduced video signal supplied by vidicon 85a. Component 85c, FIG. 4, may have the usual NTSC camera circuits or the equivalent for generating a complete composite video signal for supply via conductor 167 to component 172, FIG. 3.

If recording is made with the turntable 31 rotating at constant speed, then the aspect ratio of recorded images will vary with the radius of the track section. Preferably at the track section with maximum radius the recorded aspect ratio is eight to three in FIG. 1B and four to three in FIG. 1C so that the recorded lines overlap, having reference to the playback function of the system of FIG. 4 over the entire extent of the video track 12. While the inner convolutions such as 12-24 and 12-25 of the video track 12 are compressed in the tangential direction compared to outer convolutions such as 12-1 and 12-2, degrading the vertical resolution slightly, the picture shape of the reproduced video track 12 on the video display remains constant although the scanning raster of camera tube 85a is varied to conform with the size variation of the recorded image field or frame.

Where the transducers 110 and 121 are to be used on the same disc record, the head 121 may be evenly spaced between light source 22 and transducer 110, and magnetizable layer 115 may be restricted to the area traversed by head 110. Then the tracks 12, 170 and 25 would have each respective convolution thereof equally spaced and the tracks 12, 170 and 25 would be on separate annular regions of the record. However it is more economical of record space to assign both sound and sync to the inner area, especially since visible sync marks and magnetic tracks can occupy the same area without mutual interference.

With the configuration shown in FIG. 3, layer 115 is translucent or is limited to a spiral magnetic track which interleaves with the optical track 170; or the light source 120 can be in the infra red spectrum which will readily penetrate unexposed portion of record 10 and the magnetizable layer 115, allowing both optical and magnetic tracks in the same area. Of course transducer 121 could be of the same type as magnetic transducer 110, and record and reproduce vertical and horizontal sync pulses on a separate or interleaved part of layer 115.

The image rate marks recorded or printed on spiral tracks such as 116, 117, or 170, or as scanned by photocell 227 or 231, may be selected to meet the requirements of other broadcast television systems such as the European television system, for example.

A record changer may be utilized with the illustrated embodiment to supply a succession of records, for example by automatically removing records by lifting the same axially upwardly to clear hub 30b, the hinged arm 130 being swung out of the way. Afterwards the records may be moved in a horizontal plane as viewed in FIG. 3, a further record being applied to the turntable 32 as the previous record is being removed. The turntable 32 may be of translucent plastic material to allow light passage if the light source 120 and the optical pick-up 121 are utilized.

DESCRIPTION OF FIGS. 13–15

FIG. 13 illustrates a portion of a disc record medium 400 which is to be driven at a constant rotational rate during playback. Disc 400 is provided with a spiral video track corresponding to track 12 of FIG. 1 with successive convolutions such as indicated at 401, 402, 403 and 404 at progressively decreasing radial distances from the axis of rotation. Each track is shown as having a continuous series of recorded video images, the images having a constant radial extent corresponding to the constant radial distance between the center line of successive tracks. By way of example, the recorded images may be produced by the recording system of FIGS. 2 and 3. With a constant rotational rate of the disc record 400 during recording, the circumferential extent of the images is proportional to the radial distance of the associated video track from the axis of rotation. Thus, recorded images such as 401a and 401b of video track 401 have a greater circumferential extent than recorded images 404a and 404b of track 404. During recording operation, the recording light spot may be scanned along successive lines beginning at a line such as represented at Z-Z in FIG. 1C and successively displaced until a line is scanned as indicated at X-X in FIG. 1C. By way of example, if the center to center radial separation of the successive tracks 401-404 is one millimeter, then the light spot produced by the recording apparatus may scan along lines having an extent of one millimeter and parallel to the radial line such as indicated at 408 in FIG. 13 and corresponding to the line Y-Y in FIG. 1C. The rate of displacement of the successive lines of the recording light spot between planes such as Z-Z and X-X in FIG. 1C would be such that the recorded image 401a would have a circumferential extent somewhat in excess of the optimum dimension of ⅜ millimeter on the record track 401. The range of deflection of the recording light spot in the direction of circumferential movement of the record would be progressively reduced along the successive tracks such as 401-404 such that the innermost record track would record images with a circumferential extent somewhat less than the optimum of ⅜ millimeters.

As indicated in FIG. 2 at 410 a variable resistance 410a may have a movable contact 410b coupled mechanically with the disc support carriage 35 such that the effective resistance between input conduct 411 and output conductor 412 varies as a function of the radius at which the recording transducer is operating. This effective variable resistance may be inserted into the size control circuit of the scanner tube 90 as indicated at 412 in FIG. 3 so that the range of deflection of the successive scanning lines in the direction of record movement progressively reduces with progressively reducing radius at which the scanner is operating on the disc 400. The progressive reduction in circumferential extent of the recorded images of successive tracks 401-404 has been exaggerated in FIG. 13 for clarity of illustration. Thus, in actuality, if the radius of recorded tracks varied over fifty millimeters, the circumferential extent of successive tracks 401-404 would progressively decrease, and the difference between the circumferential extent of recorded image 401a and recorded image 404a would be of the order of six percent. For this extreme example, the circumferential extent of an outer image such as 401a might be ⅜ millimeter, while at the innermost track on the disc 400, the circumferential extent might be the optimum for a track width of one millimeter, namely ⅜ millimeter. In FIG. 2, a second variable resistor 414 is indicated for manual setting so as to obtain the recorded field images as indicated in FIG. 13.

Referring to the recorded video disc of FIG. 13, recorded control marks have been diagrammatically indicated at 421 associated with successive recorded images of each of the tracks 401-404. For the example shown, these control marks are recorded at a midpoint in each field interval of the television signal being recorded, the control marks 421 being produced for example by means of a normally energized light source 422, FIG. 19, which is momentarily switched off at the midpoint of each field of a television signal being recorded. By way of example, if the vertical blanking interval corresponds to a minimum of five percent of the field interval of 1/60 second (corresponding to about thirteen horizontal lines), then a pulse can be generated to turn off source 422 momentarily after a time delay corresponding to about 125 lines following each vertical blanking interval. The pulse may have a duration corresponding to about one horizontal line (about sixteen milliseconds), for example. Similarly, the marker source may be the scan beam itself, turned off at the time corresponding to 421, otherwise recording picture information.

Alternatively, instead of using source 422, the beam of tube 90 may be switched to a blacker than black level continously during each vertical blanking interval to provide a solid opaque region between the successive recorded images such as 401a and 401b (The recorded images would have black picture elements recorded with a higher beam intensity than the "blacker than black" beam intensity.) The radially outer portion of this solid opaque region may be scanned by a suitable phototube such as indicated at 423, FIG. 19, to generate control pulses during playback.

By way of example, a scanning aperture is diagrammatically indicated at 430 in FIG. 13 which may serve to scan the outer five percent of the radial extent of each recorded image such as 401a.

While the recorded images of FIG. 13 may comprise recorded field images produced by the recording apparatus of FIGS. 2 and 3, it will be understood that the recorded images of FIG. 13 may comprise complete pictures corresponding to complete frames of a video signal, and may be recorded photographically so that the recorded images constitute perfect rectangles with center lines coinciding with a radial axis such as indicated at 408 in FIG. 13. In this case also, the control marks such as 421 may comprise opaque recorded lines in a translucent field as indicated in FIG. 13, or the triangular spaces between successive recorded pictures such as 401a and 401b may be completely opaque so as to generate the control signals for use during playback.

For playback of the disc record 400, an apparatus such as indicated in FIG. 4 may be employed, the video scanning aperture as provided by the lens system 85b being diagrammatically indicated by the circle indicated in dash lines at 431 in FIG. 13. FIG. 14 indicates diagrammatically the target 216 of FIG. 4 and the effective location of the aperture 430 when projected onto the target 216. The deflection circuits for the vidicon tube 85a of FIG. 4 are adjusted so that a region such as indicated by the dash line 443 is initially scanned on the target 216. It will be noted that the horizontal scan lines begin to the right of the region effectively scanned by photocell 430 so as to scan, for example, only ninety-five percent of each recorded image such as 401a, namely the portion of the recorded image radially inwardly of the region being scanned by aperture 430. Furthermore, since the circumferential extent of the recorded images progressively reduces as a function of the radial distance thereof from the center of rotation of the disc 400, the vertical deflection of the scanning beam of vidicon 85a is correspondingly progressively reduced. This progressive reduction is effected by means of variable resistance 450, FIG. 4, which is provided with a movable tap 450a mechanically coupled with the movement of turntable 210 during playback as represented by the dash line 451. The conventional vidicon circuit includes a vertical size control which can be modified by variable resistor 450 so as to progressively reduce the range of vertical deflection of the beam of vidicon 85a. For the case where the record 400 contains recorded fields, the initial aspect ratio of the raster of the vidicon as indicated at 443 may be near the optimum aspect ratio of eight to three, while the minimum raster as indicated at 445 in FIG, 14 which is present during scanning of the innermost video track on record 400 will correspond to an aspect ratio somewhat greater than the optimum aspect ratio of eight to three. It will be observed from FIG. 13 that control mark scanner associated with aperture 430 will emit a control signal upon alignment of a recorded image with the vidicon 85a. Thus the light source 22 would flash at the instant of time represented in FIG. 13, after scanning of a control mark such as that indicated at 421 in FIG. 13.

For the case where record 400 contains complete recorded frames, the initial scanning raster in FIG. 14 might correspond to an aspect ratio somewhat less than four to three, (e.g. about two to three), and the final aspect ratio during scanning of the innermost video track might be near the optimum aspect ratio of four to three.

Where solid triangular opaque regions intervene between the successive recorded pictures, the leading or trailing edge of the resulting control signal could be utilized to lock in a 120 cycle per second oscillator component of trigger circuit 215 so as to provide for the flash of light source 22 at exactly the desired angular position of the record (with scanning aperture 430 midway between two successive opaque regions).

The deflection circuits of component 85c would also receive the control signal from the scanner associated with aperture 430 via conductor 166, and the deflection circuits component 85c would include a delay component suitable to provide the vertical blanking of the vidicon 85a during the time that light source 22 was being flashed. Thus, if the pulses of FIG. 15A represent the leading or trailing edges of the control signals from scanner 430, such pulses may serve to initiate the vertical blanking pulse as shown in FIG. 15B for blanking the beam of vidicon 85a. A similar pulse occurring somewhat after the leading edge of the blanking pulse of FIG. 15B and terminating somewhat prior to the trailing edge of the vertical blanking wave form of FIG. 15B would be supplied by trigger circuit 215 to the light source circuit 22 for producing the desired flash of light from light source 22. Thus, by the time that the vidicon beam is unblanked and begins its vertical sweep cycle, the desired charge image of the recorded picture will have been produced on the target 216. While the initial waveform supplied to conductor 453 in FIG. 4 will have a maximum amplitude as indicated in solid outline in FIG. 15C, the amplitude of the vertical deflection current to vidicon windings 454 will be progressively reduced until such waveform reaches the minimum amplitude represented by the dash line waveform in FIG. 15C as the vidicon 85a is scanning the innermost video track on the record 400. Thus the video output at 167 in FIG. 4 will be a conventional video signal representing the scanning of successive recorded fields at the conventional vertical field rate for monochrome or color broadcast television.

Where complete recorded image frames are provided on the record 400 with the aspect ratio approximating the optimum of four to three, then the vidicon 85a would carry our the normal interlaced scanning with respect to each recorded frame so as to produce interlaced field signals with respect to each recorded image frame. In this case, the control pulse such as represented in FIG. 15A after suitable delay would be utilized to synchronize a vertical deflection oscillator which would be operating at a nominal frequency of sixty cycles per second in response to a lock-in pulse rate of nominally thirty pulses per second.

DESCRIPTION OF FIG. 16

FIG. 16 shows a transducer system similar to FIGS. 13-15 where the recorded images of disc 500 are of equal size over the successive tracks such as indicated at 501-505. Here each of the recorded images such as 501a and 501b and 505a and 505b has the same circumferential dimension, the inner tracks such as 505 having a lesser total number of recorded images than outer tracks such as 501. Such a record 500 is driven so as to have a constant track scanning speed as the successive tracks 501-505 are scanned, this type of apparatus being illustrated in FIG. 6, for example.

In the embodiment of FIG. 16, control marks such as indicated at 511-513 could be scanned by means of a scanner such as indicated at 238, 227 in FIG. 6. Alternatively, light source 238 which is continuously energized in the present embodiment may be located on one side of the record 500, for example the lower side, while the receiving photocell such as 227 would be located at the opposite upper side of the disc record 500. The effective scanning aperture of this scanner arrangement is diagrammatically indicated at 521 in FIG. 16 while the effective vidicon scanning aperture is represented by the dash line circle 522. With the arrangement of FIG. 16, it is preferred that the control signal from the scanner represented at 521 occur essentially simultaneously with the alignment of a recorded image such as 501b with the vidicon aperture as indicated at 522. Thus a control pulse conforming with the leading edge of the control signal due to the scanner at 521 may directly trigger the initiation of a blanking interval of the vidicon, and may result in a flashing of the light source such as 22 as soon as the vidicon has been blanked. Again, the duration of the light flash may be less than the duration of the vertical blanking interval, and may be adjusted to have a duration which is optimum as described previously and in specific Examples hereafter.

As explained with respect to FIG. 14, the scanning of the vidicon in the horizontal direction (corresponding to the radial direction on the record) may be limited so as to avoid any possible problem due to leakage of light from a light source such as indicated at 238. Preferably, however, the scanner location such as indicated at 521 is such that the light source 238 will not introduce any substantial amount of light to the target such as 216 of the vidicon playback device, such light being masked, or intercepted by the photosensitive cell assembly for vertical sync pickup. Thus, the scanner location 521 is shown as corresponding to a region beyond the scanned portion of the vidicon target so that any illumination of this portion of the picture does not affect the output signal from the vidicon.

The record of FIG. 16 may be produced by any of the procedures disclosed herein including the interlaced scanning procedure described with reference to FIG. 1C during rotation of the record to provide constant track scanning speed as described with reference to FIG. 6, for example.

The records of FIGS. 13 and 16 may, of course, be reproduced by means of an intermittent drive such as described with reference to FIG. 8. The control marks may define the stopping points so as to insure that the record is stopped with each of the recorded images centered on the vidicon scanning aperture. With such an arrangement, of course, each recorded field or frame image may be flashed onto the vidicon target a desired number of times. For example, the light source could be flashed four times while the same picture is stationary in the gate, the flashes being nominally 1/60th second apart, so that they occur once during each vertical blanking interval in reproducing a recorded field image; or a recording frame image while stationary could be flashed twice, once during each successive vertical blanking interval, while being scanned to produce interlaced field signals. As another example, for slow motion, each recorded picture of a normally 15 picture per second sequence could be flashed twelve times before the record was indexed to the next picture while the average speed of the record was reduced to ⅕ of the speed that showed real-time action. If five different pictures were in the gate per second each one flashed twelve times before indexing to the next one, the vidicon target would then still receive and scan sixty images per second, but the action or motion would be at a reduced speed, for example at one third the real time recording speed.

With the use of an optical compensator, each recorded picture could be flashed a number of times during continuous movement past the vidicon scanning aperture. The shift in picture location because of movement of the record between successive flashes is compensated by the optical compensator such that each flashed picture is always located in the same position on the playback vidicon target. An optical compensator is described in the article "Reducing Aberrations in Rotating-Prism Compensators for Nonintermittent Motion Pictures" by Gerhard Schwesinger, *Journal of the Optical Society of America*, volume 42, number 12, December, 1952.

DESCRIPTION OF FIGS. 17 AND 18

FIG. 17 illustrates a playback transducer system which is generally similar to the recording transducer apparatus of FIG. 3. Thus, the apparatus of FIG. 17 includes a disc record 600 which may correspond to any of the disc records described herein. As shown in FIGS. 2 and 3, the disc record is progressively moved radially during the rotation thereof, and such movement is synchronized with the movement during recording operation so that the scanning aperture of playback apparatus 601 scans along the spiral video track of record 600, light source 602 being flashed momentarily each time a recorded image comes into alignment with the scanning aperture so that a light image of the recorded picture is transmitted via lens assembly 603 and focused onto a target of a video camera device such as vidicon 85a of FIG. 4. A framework 606 of the apparatus may have an arm 607 pivotally connected therewith by means of a pin 608, and arm 607 may carry light source 602. The arm 607 may provide a grooved backing plate 608 with raised rib portions, similar to the ribs 304-307 of FIG. 12A, engaging the topside of the record 600 at the marginal portions between successive video track portions. A gate clearance adjustment screw 610 is threaded through the arm 607 and locked at a desired condition of adjustment by means of lock nut 611. A bias spring 614 is operative during play mode to retain the arm 607 in the position shown with the adjustment screw 610 abutting post 615. When arm 607 is pivoted upwardly (counterclockwise) about pin 608, spring anchoring member 616 is preferably moved upwardly also so as to inactivate spring 614 while arm 607 is in a record loading position. A ball detent is indicated at 619 for retaining arm 607 in its inactive position where it abuts stop 620. A coiled hairpin spring is indicated at 618 interposed between arm 607 and frame 606 for urging the arm 607 upwardly in the counterclockwise direction about pin 608. The force exerted by hairpin spring 618 is weaker than that exerted by tension spring 614 in the operating condition of the apparatus shown in FIG. 17 so that spring 618 counterbalances or lifts arm 607 when spring 614 is released, but the net downward force on the backing plate 608 when spring 614 is activated is such as to allow the backing plate to lift upwardly as necessary to pass a thick part of the record 600. Extension 621 may serve as a handle for lifting arm 607 once retainer 616 has been released, and may carry additional transducers as in FIG. 2 and FIG. 3.

At the lower side of the record 600, gate member 623 is provided with grooves corresponding to the grooves 304-307 of FIG. 12A for confronting the undersurface of record 600. As in the embodiment of FIG. 12B, however, gate 623 is provided with an air connection 624 for admitting air under a slight positive pressure sufficient to normally maintain clearance between the underside of the record and the ridges of gate 623. The air chamber within gate 623 is essentially sealed off by the thread connection at 625 which provides for longitudinal adjustment of the lens assembly 603 when the lens assembly is rotated by means of lever 626. The critical recorded photosensitive layer of record 600 may be at the upper side which engages with the backing plate 608. The ridges on the backing plate are spaced a radial distance equal to the radial extent of the recorded images to prevent damage of the recording. Similarly spaced ridges on the gate member 623 prevent damage to the record should it touch the gate. The ridges increase the force of air against the underside of the record for a given air pressure, allowing a lower pressure supply. While the critical recorded photosensitive layer may be at the upper side of the record, held against the ridges of the backing plate 608 by means of the air flow at the underside of the disc record, usually the record material is uniform enough in thickness so that a recorded layer at the undersurface of the record will remain in focus. Such a recording at the undersurface of record 600 is advantageous since the recording is not degraded by the refractive irregularities in the transparent backing layer.

The embodiment of FIG. 18 differs from the embodiment of FIG. 17 in that the light source may comprise a series of light emitters such as 631 and 632 arranged within the gate 633 so as to direct light onto the recorded image from the underside of the disc 600. The emitters such as 631 and 632 may comprise a series of light emitting diodes which are simultaneously energized and may be focused in common on a single image such as 600a in alignment with the gate aperture 634. Ridges such as 635 have a radial spacing corresponding to the radial extent of a video track and are located at each side of aperture 634.

As in the embodiments of FIGS. 13 and 16, control marks may be associated with the video track on record 600 for scanning by means of light source 422 and photocell 423, FIG. 19. Light source 422 is continuously energized so as to generate a control signal in response to each of the control marks on the record. The control signals from photocell 423 then control the generation of the trigger signal for the light source 602, FIG. 17, or light emitters 631 and 632, FIG. 18, in the same way as described with respect to FIGS. 13-16 and/or control the record speed so that the pictures to be reproduced are presented to the scanning aperture at the desired rate.

For the case of a record such as indicated in FIG. 13, the scanner would comprise light source 422 and a photocell 423, FIG. 19, for receiving reflected light from the underside of the record. The photocell 423 then would generate the control signals in response to scanning of the control marks such as 421 of the record 400. A delay component of the trigger circuit corresponding to circuit 215, FIG. 4, for the light source 602 or the light emitters 631, 632, may control the timing of the trigger signal to coincide with the alignment of a given picture image on the record with the aperture of gate 623 or 633. The delay may be varied by a framing control that the operator can set while watching the picture display.

For the case of a record such as shown in FIG. 16, the scanner corresponding to aperture 430, FIG. 19, would be circumferentially offset from the central radial plane of aperture of gate 623, FIG. 17, or 633, FIG. 18, or 654, FIG. 19, so as to generate a control signal substantially at the instant of alignment of a given picture on the record with the vidicon aperture (such as 522, FIG. 16, or 431, FIG. 19). A suitable shielding means is indicated at 644, FIG. 19, for preventing light from the scanner source 422, FIG. 19, from entering the scanning aperture 431 in any desired location of aperture 431, whether radially aligned as actually shown in FIG. 19, or circumferentially offset to a position as indicated at 521, FIG. 16.

DESCRIPTION OF FIG. 19

FIG. 19 shows exemplary details of a mark scanner for the record of FIG. 13 wherein the scanner comprises light source 422 and receiving photocell 423. The recess 653 may have a rectangular aperture at 430 conforming with the shape of the marks 421, where the recess 653 opens at the undersurface of record 400. The rectangular aperture 430 of recess 653 would have the center line parallel to its length dimension coinciding with the radial axis 408 in FIG. 13.

Where recording of the images such as 401a is by means of a scanning light spot as in FIGS. 2 and 3, the picture modulation corresponding to a black picture element may be recorded with a relatively low intensity of light. The horizontal and vertical blanking signals may be separated in the video circuits of component 164 and supplied to the beam intensity control in component 160, FIG. 3, so that the beam intensity is essentially zero during horizontal and vertical retrace intervals. Thus the marks 421 can be recorded by maintaining a light source such as 422, FIG. 19, energized at the black picture level except when blacker than black marks 421 are recorded by momentary complete shut off of the light source such as 422 at the midpoint of each field recording interval. The midfield point can be obtained during recording operation simply by counting horizontal sync pulses, while resetting the counter for the duration of the vertical blanking signals. The gate assembly 654 of FIG. 19 when applied to playback operation may correspond to that of FIG. 4, FIG. 17, or FIG. 18, for example.

DESCRIPTION OF FIGS. 20 and 21

FIGS. 20 and 21 illustrate a cluster of light sources 671-677 which may be jointly energized by a trigger circuit such as indicated at 215 so as to illuminate a disc record 680 which may correspond to any of the records described herein. By way of example, the light source 671-677 may be associated with the gate assembly 654 of FIG. 19 so as to transmit successive light images via aperture 431 to the target of a vidicon camera tube such as indicated at 216 in FIG. 4. The marks such as indicated at 681 in FIG. 21 may correspond to the marks 421 of FIG. 13 and may successively trigger photocell 423, FIG. 19, to energize or flash the light source elements 671-677. By way of example the elements 671-677 may be light emitting diodes. While the diodes have been shown diagrammatically in FIG. 21, preferably the diodes would be mounted as close together as possible, for example by trimming the plastic shell in which they are encapsulated.

An alternative solid state source for use in place of source 22, FIG. 4, or 602, FIG. 17, or 631, 632, FIG. 18, is the laser type which resembles a light emitting diode but is capable of very high peak outputs in the pulsed mode of operation as taught herein. The laser type sources emit as 900 nanometers wave length, for example, so that it is advantageous to use them with vidicons that are especially sensitive to this wavelength. Alternatively, however, a conventional vidicon will respond to wavelengths of the order of 900 nanometers also.

The objective of the lens assembly such as 85b, FIG. 4, 603, FIG. 17, 683, FIG. 18 or 684, FIG. 19, should have a high numerical aperture, preferably 0.25 or more, to collect maximum light from an extended area source.

MODIFICATION OF FIGS. 13 AND 16

In FIG. 13, picture information may be recorded over the entire extent of image regions such as 401a and 401b except at the control marks 421. Since the picture recording never falls below the black level, the shut off of the recording beam while scanning one or more lines, at the left margin thereof, will produce a distinctive blacker than black control mark 421. Thus, the same recording light beam can be used for producing the control marks 421 as for recording the rest of the picture images. Playback may be as represented in FIG. 14 with the vidicon scanning raster omitting the regions of the control marks, for example. In practice, the control marks produce a signal when the reflected light falls below a critical value, so that timing accuracy is adequate even if the control mark is of substantial circumferential extent.

In the embodiment of FIG. 16, the entire regions between the successive picture information areas such as 501a and 501b may be blacker than black because of the shut off of the scanning beam in this region, the picture information being recorded with a beam intensity which never falls below the black level. Thus again, the same scanning beam can be used for recording of the control regions or marks as is used for producing the recorded picture information. The contol signal is triggered when the reflected light at scanner 521, FIG. 16, for example, falls below a critical value so that the accuracy is better than expected from the circumferential extent of such a control region. During playback operation, the control signal is transmitted through an adjustable delay component, so that each flash of the recorded picture information takes place at the correct instant of time.

As a further modification of FIG. 13 or FIG. 16, the images such as 401a or 501a may be arranged with their longer dimension directed tangentially along the record tracks 401-404, or 501-505, such images being recorded with an aspect ratio of four to three, for example, or eight to three, with intermittent movement during recording and exposure of the disc record from a photomaster of the same aspect ratio and with its longer dimension tangential. Blacker than black vertical rate or frame rate control marks are then present in the wedge shaped non-recorded regions between adjacent edges as in FIG. 16, and which may be scanned as at 521, FIG. 16, during playback. An advantage of this arrangement is that turntable speed is increased giving better sound reproduction. (The arrangements of FIGS. 9, 10 and 11 also have this advantage, doubling the turntable speed). Total recorded playing time remains the same.

EXPLANATION OF THE DIAGRAMMATIC SHOWING IN FIGS. 1B AND 1C

In FIG. 1B, lines 21-523 and 21-525 have been shown as recorded blacker than black for diagrammatic purposes. Actually the lines occurring during the vertical sync intervals (e.g. odd line numbers 491, 493, 495 and even line numbers 492, 494, 496) are ideal for use in generating control signals at the field rate, and would be the actual recorded blacker than black lines in FIG. 1B, other lines being substantially at the black level during the vertical blanking interval.

In FIG. 1C, separate blank-out signals would turn the beam off during retrace intervals, while lines occurring during alternate vertical blanking intervals would not be subject to such a separate blank-out signal, and even-numbered lines such as 492, 494, 496 occurring during an active vertical sync interval would be recorded at the blacker than black level, rather than lines such as 97-524 which has been indicated as recorded blacker than black for diagrammatic purposes.

SUMMARY OF OPERATION

In recording mode, the apparatus of FIGS. 2 and 3 may produce the recording of successive fields as indicated in FIG. 1B or the recording of successive complete frames as indicated in FIG. 1C.

For the case of FIG. 1B, the light spot produced by scanner 90, FIG. 3, may scan repeatedly along the path indicated at 19 in FIG. 1B to record the successive lines of each video field as the record track moves in the direction of arrow 18, FIG. 1B. By way of example, white picture elements may be produced with the beam of scanner 90 having maximum intensity, the black picture level being represented by a substantially reduced beam intensity, the horizontal and vertical blanking levels being represented by a still further reduced beam intensity, and the level corresponding to the peaks of the horizontal sync pulses being represented by essentially zero beam intensity, the beam also being essentially turned off during the return trace by means of a separate blank-out pulse. Thus, for example, if the white level corresponds to 100% beam intensity, then the black picture level may correspond to 25% of maximum beam intensity and the blanking level and the front and back porches of the horizontal synchronizing signals may correspond to a beam intensity of 25% of maximum. Where the duration of each vertical blanking interval corresponds to about 13 horizontal lines, the first three lines approximately of each recorded vertical blanking interval would be recorded at essentially 25% of maximum beam intensity (during the equalizing pulse interval). During the vertical sync pulse interval corresponding to approximately three further horizontal lines, the beam intensity would essentially be zero. Thus with this type of recording, lines such as 21-523 and 21-525 of the odd line fields and lines such as 21-522 and 21-524 of the even line fields would be recorded with a beam intensity of approximately 25%.

During playback of a record such as indicated in FIG. 1B, each recorded field such as indicated at 14-1 could be transferred in its entirety to the vidicon target such as 216 in FIG. 4, the vidicon scanning beam being blanked out during horizontal retrace intervals. However, the circuits component 85c of FIG. 4 could be adjusted so that the vidicon beam actively scans 255 recorded lines, for example, so that the vidicon would scan at least five of the recorded lines which occur during the vertical blanking interval of the recorded video signal. The vidicon circuits could be adjusted to respond to the blacker than black signal level of these recorded lines so as to generate vertical rate control pulses which could be separated from the video signal in the same way that vertical blanking signals are separated in a conventional television receiver. Such a source of playback vertical frequency is represented by component 701 in FIG. 6, and as indicated in FIG. 6, the phase of such vertical rate control pulses after passage through an adjustable delay 702 may be compared as to phase with vertical reference pulses from source 222, 223 or 224. Thus phase comparator 226 may operate to adjust the speed of rotation of the disc record 10 such that the successive recorded images occur at the desired region of target 216, with recorded line number one, for example, being scanned first by the beam of vidicon 85a, and with the recorded vertical blanking signal occurring at the end of each scanning cycle of the vidicon 85a. As indicated at 166 in FIGS. 4 and 6, vertical reference signals may be supplied from any of components 222, 223 or 224 to trigger circuit 215 so as to control the flash rate of light source 22 with a standard source, for example from a separated vertical sync signal from a broadcast station which operates at 59.94 plus cycles per second. The same standard also initiates the vertical sweep of vidicon 85a, FIG. 4, preferably through an adjustable delay component. The pictures flashed on the targe 216 then have the recorded vertical blanking interval occurring as a blacker than black band at the lower part of target 216 if the record is turning at exactly the correct rate and in the proper phase. If the blacker than black recorded vertical blanking interval is too high or too low on the target 216, the playback separated control pulses from delay component 702 will occur too soon or too late, and comparator component 226 will adjust the rotation of the disc record 210 to restore the desired relationship. Thus, if the recorded vertical blanking signal is being scanned by the vidicon too soon, the record rotational speed is retarded by brake 233, for example.

Alternatively, as indicated at 229a, 229b and 229c, the deflection of scanner 90, FIG. 3, may be adjusted so as to scan track 116 during a portion of each horizontal blanking interval of the recorded video signal, the blanking of the beam being omitted during the vertical blanking interval so as to record vertical rate marks in the track 116. Such recorded vertical rate marks on track 116, FIG. 1B, can be scanned by means of a scanner assembly such as indicated at 422, 423 in FIG. 19 during playback so as to provide the playback vertical frequency of component 701, FIG. 6. The edge sync marks such as 229a, 229b and 229c need not be transferred to the target 216 during playback as is illustrated in FIG. 19.

The record of FIG. 1B may be recorded during rotation thereof at a constant rotational speed. Thus, as turntable 210 progressively shifts relative to vidicon 85a, the vertical deflection of the vidicon is progressively reduced as indicated in FIG. 14 without a change in the number of recorded lines which are scanned. Alternatively, turntable 210, FIG. 6, may have a spiral series of control marks which are equally spaced for scanning by means of source 240 and photocell 231, so that the arrangement of FIG. 6 maintains a constant track scanning speed during recording. In this case, each of the recorded field images such as 14-1 and 14-2 would have equal circumferential extent on each of the successive tracks such as indicated at 12-1 through 12-25 in FIG. 1. In this case, the innermost recorded image would preferably have the optimum recorded aspect ratio of eight to three, and the vidicon would scan with a corresponding aspect ratio of eight to three on the target 216.

In operation for producing the record of FIG. 1C, the scanner 90 of FIG. 3 has its beam deflected vertically as well as horizontally. Thus, with zero beam deflection current supplied to the vertical deflection coils 191, 192, FIG. 3, the beam of scanner 90 may cause scanning along a radial plane such as indicated at Y—Y in FIG. 1C. As current in the vertical deflection coils progressively increases in the negative direction, the successive scanning lines are progressively offset substantially parallel to plane Y—Y in the direction opposite to the direction of movement of the record track until at the end of a first video field, the beam causes scanning in the plane Z—Z. The vertical deflection current then rapidly shifts from a negative maximum to a positive maximum so as to shift the scanning to the plane X—X with the beam of scanner 90 switched off by means of the vertical blanking signal occurring between the odd line field and the even line field. The vertical deflection current then proceeds to gradually change from a positive maximum to a negative maximum during the occurrence of the even line field of the first frame such as 97 and during the odd line field of the second frame such as indicated at 98. Accordingly, the vertical blanking interval between the frames 97 and 98 including even lines such as 97-524 can be recorded with a blacker than black level. The excursion of the vertical deflection current from a positive maximum to a negative maximum takes place in 1/30 second, but otherwise the waveform corresponds to an inverted version of the waveform shown in FIG. 15C. A simple divide by two circuit can remove alternate vertical blanking signals within component 160, FIG. 3, so that the beam of scanner tube 90 remains at the blacker than black level during the vertical blanking or sync interval between successive frames being recorded, with sync marks at precisely equal time intervals.

As indicated at 230a, 230b and 230c in FIG. 1C, the range of horizontal deflection of the beam of scanner 90 may be such that portions of the vertical blanking intervals of the signal being recorded which occur between successive frames are recorded in the marginal track 117.

During playback of the record of FIG. 1C, one of the sources 222-224, FIG. 6, may be supplied via conductor 166 to trigger circuit 215, FIG. 4, so as to flash a light source such as 22, FIG. 4, at a standard field rate of 60 flashes per second, or a standard frame rate such as 30 flashes per second, the trigger circuit 215 including a divide by two circuits for this purpose. The vidicon may scan a number of the recorded even lines of each recorded frame which occur during the vertical blanking interval so as to generate a frame rate control pulse which can be separated within a component such as indicated at 701 in FIG. 6 by circuitry similar to the conventional vertical sync signal separating circuit of a television receiver. Delay component 702 can be manually adjusted so that phase comparator 226 controls rotation of the record so as to provide for the correct location of each successive frame on the target 216.

Where the record of FIG. 1C is recorded with a constant rotational rate, a variable resistor may be coupled with turntable translation as illustrated at 450 in FIG. 4, but for the purpose of varying the vertical deflection of scanner 90 during recording in the same way that vertical deflection of the vidicon 85a is varied during playback. In this case the deflection current to scanner coils 191 and 192 would vary from a maximum amplitude to a minimum amplitude as successive convolutions of the spiral track were recorded, in the same way as indicated in FIG. 15C for the playback deflection current.

Where frame rate marks such as 230a, 230b and 230c, FIG. 1C, have been recorded in the track 117, track 117 may be scanned by means of a light source 422 and photocell 423 as indicated in FIG. 19 so as to supply frame rate signals for component 701, FIG. 6. The recorded control marks such as 230a–230c need not be transmitted to the target 216, and the vidicon scanning beam may be blanked off for the entire duration of the horizontal and vertical blanking intervals in this case.

In operation of the embodiment of FIGS. 9 and 10, the record 292 may move continuously from left to right as viewed in FIG. 9 with the record having the successive positions shown in FIG. 10 at successive intervals separated by 1/60 second, for example. Thus, at the instant represented at t=1 in FIG. 10, light source 22a is flashed to transmit a light image of frame x on target 216a which may correspond to the target 216 of FIG. 4. During the interval between t=1 and t=2, the vidicon such as 85a will generate the odd line field signal in accordance with the recorded frame x. Then at the instant of time represented at t=2 in FIG. 10, light source 22b is flashed to project the same image x onto the target 216a again, this time generating even lines of the interlaced field in accordance with image x. Thereafter, at time t=3 as represented in FIG. 10, light source 22a is flashed to begin the readout process for the second recorded frame y. By way of specific example, the successive images such as x and y may be recorded along a spiral track of a disc record which moves at a constant track scanning speed, the disc record 292 having a spiral control channel such as indicated at 117 in FIG. 1C for scanning by means of a scanner such as 422, 423, FIG. 19. The control mark signals so generated may sequentially trigger the light sources 22a and 22b. The scanned mark signals from photocell 423, FIG. 19, may provide the playback vertical frequency signals for source 701, FIG. 6, and may be compared as to phase with one of reference sources 222-224 to maintain movement of the record 292 at the constant track scanning speed. The reference vertical frequency at 166, FIG. 6 and FIG. 4 may initiate the retrace intervals of the video deflection circuits of vidicon 85a, FIG. 4, so that a retrace interval of the vidicon begins just prior to each flashing of one of the light sources of FIG. 9. Thus, the beam of vidicon 85a is blanked out during each flashing of the light sources 22a and 22b, FIG. 9. The record 292 may have a second signal recorded in alternate locations, such a second signal being indicated at x', y' in portion t=3 of FIG. 10.

In operation of the embodiment of FIG. 11, the record may correspond to record 292 of FIG. 10 except that the second series of frame or field images recorded at x' and y', etc., can be played back simultaneously with the playback of the first series x, y, etc. The record again is moved at constant track speed and frame or field rate control marks in a channel corresponding to channel 117, FIG. 1C, are scanned by means of a scanner corresponding to that shown at 422, 423 in FIG. 19, such scanner being diagrammatically indicated at 710 in FIG. 11. The frame or field rate control signals from component 710 may serve to trigger component 296 so as to flash light sources 22a and 22b and to correspondingly switch over channel selector switch component 711 such that the video sequence x, y, etc., and the video sequence x', y', etc., are reproduced simultaneously by means of the vidicons associated with the resective targets 294 and 295. As in the embodiment of FIG. 10, each frame rate control pulse may initiate retrace of the vidicons associated with targets 294 and 295, and after a slight time delay may provide for the flashing of the light sources 22a and 22b and the changeover of the switch 711. By way of example, the first series x, y, etc., may represent the luminance information of color video sequence and be supplied via a first channel (ch. 1) while the second series x', Y', etc., may represent the chrominance information of the recorded color video sequence and may be supplied via the second channel (ch. 2).

In producing the record 400 of FIG. 13, the recording apparatus of FIGS. 2 and 3 may be rotated at constant speed and the scanning line produced by scanner 90 may be progressively deflected from a location such as indicated at Z—Z in FIG. 1C to a location such as indicated at X—X within the time for recording one field of the video signal. The beam of scanner 90 may be shut off during horizontal and vertical retrace intervals, and the rate of line deflection may be twice the maximum track speed of the track being recorded so that the recorded fields have a sequence on the record which is the reverse of that shown in FIG. 1B. The vertical blanking signals of the video signal being recorded may be separated and utilized to synchronize an oscillator or pulse generator operating at 120 pulses per second, the alternate pulses then occurring midway between successive vertical blanking intervals and serving to record a control mark such as indicated at 421 in FIG. 13. Thus, for the innermost track of the record 400, the track may move ⅜ of a millimeter in 1/60 second while the beam may move in the circumferential direction between planes such as Z—Z and X—X over a distance of ¾ millimeter. In this instance, the control mark signal producing mark 421 would occur while the beam is scanning along a central radial line such as indicated at Y—Y in FIG. 1C, and after the record has moved 3/16 millimeters, so that the mark 421 would occur in correspondence substantially to the middle line of the field such as 401b being recorded. The marks such as 421 may be produced by pulsing a light source such as indicated at 422, FIG. 19, associated with a gate assembly such as indicated at 93 in FIG. 3, the aperture 430 being in alignment with the line 19 indicated in FIG. 2 and directly adjacent the aperture corresponding to aperture 431 in FIG. 19. As indicated at 410-412 in FIG. 2, the vertical deflection of the scanner 90 may be progressively reduced in proportion to the track speed of the track being scanned as is indicated in FIG. 13. Similarly, during playback, the range of vertical deflection of the vidicon such as 85a, FIG. 4, may be progressively reduced as indicated in FIG. 14 so as to match the decreasing size of the recorded images. The control mark scanning aperture 430 of FIG. 14 may be provided as indicated in FIG. 19, the recess 653 of FIG. 19 being associated in this case with a playback gate assembly such as indicated at 85b in FIG. 4. As indicated in FIG. 15, the control pulses from scanning aperture 430, FIG. 14, may initiate vertical blanking intervals when the beam of the vidicon is blanked off, and the flashing of the light source such as 22, FIG. 4, 602, FIG. 17, 631, 632, FIG. 18 or 671-677, FIGS. 20 and 21, may take place during the vertical blanking intervals of the vidicon.

In producing a record such as illustrated in FIG. 16, the disc record is operated with a constant track speed during recording as explained in reference to FIG. 6, for example. The recorded fields such as 501a and 501b may be produced as described in reference to FIG. 13, but with a constant deflection of the beam of scanner 90 so as to produce recorded fields with a uniform circumferential dimension of substantially ⅜ millimeters over the entire spiral track, for example. The control marks such as indicated at 511-513 may be produced by means of a scanning aperture similar to that indicated at 430 but arranged generally at the location X—X in FIG. 1C. Thus, with the just recorded field lying in the region between X—X and Y—Y of FIG. 1C, the vertical blanking signal following such field would occur and would produce a mark just beyond the last actually recorded line such as line number 499 for an odd line field, or line number 498 for an even line field. The scanner such as indicated in FIG. 19 for playback of the record of FIG. 16 could then be located such that the mark 512, for example, is in alignment with aperture 430 at the time when the aperture 431 is in alignment with the recorded image 501b, for example, so that the light source can be flashed essentially at the instant of time represented in FIG. 16. Thus, receipt of each control pulse from a photocell such as indicated at 423 could serve to initiate retrace of the vidicon scanning beam and flashing of the light source for transferring one of the recorded images such as 501b to the vidicon target.

EXAMPLE I

The record is a ten inch diameter disc with an inner hub opening two inches in diameter, driven at two RPM. The picture track is 0.040 inches wide and extends in a ring somewhat less than two inches wide at the record periphery, giving about 45 tracks of ½ minute each, or 22½ minutes total. Each field has a height varying from 0.0175 inches high at the outside track to 0.0105 inches high at the inner track, departing from the optimum of 0.0150 that gives a 8:3 aspect ratio, but with a beam diameter of camera tube 85a that allows scan overlapping during scanning of light images from the outer tracks at a compromise of resolution. The beam is blanked out during horizontal and vertical retrace periods. During recording the horizontal and vertical rates are according to a broadcast picture. During playback the horizontal rate is substantially 15,750 cycles. The record has positive images, made on reversal type film by exposing to positive line scans from the flying spot recording scanner (polarity of signal to its control electrode the same as that used in picture viewing). Alternatively the playback record is printed from a negative master obtained by exposure to the above recording scanner. Sound is recorded on a magnetic surface of about six inches diameter at the inner periphery, in a spiral of about 45 tracks occupying a ring somewhat less than two inches wide.

The compromises described in this example are done in the interest of simplicity and low cost.

EXAMPLE IA

This example includes all of the parameters of Example I and the following further specifics referencing the preceding description and the drawings.

RECORDING

1. Record disc 10 of fine grain positive film, Eastman Kodak type 7302.

2. Apparatus of FIGS. 2, 3 and 12A with scanning line 19 focussed on the undersurface of the record. Case 150,151 of light-tight construction.

3. A composite video signal is supplied via line 161, the horizontal sync of the input signal providing control of the horizontal oscillator of component 160. The horizontal oscillator controls the blanking signal supplied to conductor 163 and the deflection signal supplied to deflection coils such as 162. Deflection coils 191 and 192 are energized with a vertical deflection signal coordinated with the film motion as explained in connection with FIG. 1C to give a complete series of images without overlap, and the vertical blanking signal is also supplied via conductor 163 to the cathode ray tube 90. The video signal supplied to the cathode of tube 90 has the highlights of the picture signal providing maximum beam current, and the black portions of the picture signal providing a lower value of beam current.

4. The motor 40 is energized with its rated voltage at sixty cycles per second from the commercial power line such that the record speed of rotation is substantially constant, for example within plus or minus one percent and well within the lock-in range of the deflection circuits of broadcast television receivers.

5. The 300 line per millimeter resolution of the system including the CRT 90, lenses 93 and material of record disc 10 results in nonoverlapping recorded lines for each successive recorded field over the extent of the video record track (e.g. from a radius of 4.8 inches to a radius of three inches).

PLAYBACK

1. Record as produced by the procedure of Example IA and with other conditions as in Example I.

2. Apparatus of FIGS. 2-6, but with a lightproof enclosure enclosing the light path, the lens system 85b provided with black velvet extending upwardly from camera tube 85a to engage the undersurface of record 10 in all operating positions of the lens system relative to the record. The upper side of cantilever spring 140 is provided with a ring of soft light blocking material surrounding aperture 140a for engaging lightproof casing 134, FIG. 3, and preventing access of external light to the path of light leading from light source 22, so that the playback light path is shielded from ambient light throughout its length.

3. The motor 40 is energized the same as during recording as given in this Example, i.e. to operate at the same speed as during recording within plus or minus one percent.

4. The horizontal rate oscillator of component 85c is operated at substantially 15,750 cycles per second synchronized to the field rate sync signal from 166 and is used to produce the line rate deflection signal supplied to the horizontal deflection coils of camera tube 85a and to control supply of the horizontal blanking signal. The phase of the field rate signal is adjusted by component 215 such that each recorded image is flashed by light source 22 during the vertical blanking interval of camera tube 85a.

5. The reproduced video signal from the system of FIG. 4 at output 167 includes horizontal and vertical sync signals and conforms to an NTSC standard video signal, and any variation in sync rate is within the tolerance limits of conventional broadcast television receivers.

6. We are flashing a complete field onto the vidicon target. With constant angular velocity of the record the field becomes smaller in the vertical direction due to crowding of line scans at the inner parts of the disc record. This can be compensated by shrinking the vertical sweep of the playback vidicon so that it covers the flashed images at inner lines of the disc. The vertical sweep current of the vidicon is therefore regulated in accordance with the relative position of record and the pickup gate, such that the sweep is increased for outer lines of the record and decreased for inner lines. A variable resistor coupled to the record movement can adjust the vertical height by including this resistor in the vertical sweep circuit that drives the vidicon, and which commonly includes a height setting resistor.

EXAMPLE IB

This Example is the same as Example IA except that the overall system provides a resolution of 10,000 line pairs per inch, the recorded lines having a maximum separation (unrecorded space) of fifty microinches between lines and the playback beam of vidicon 85a having a diameter capable of resolving the magnified image of the recording as projected onto the vidicon target preferably with the recorded lines in overlapping relation relative to the playback beam diameter. Again any gradual change in picture size on target 216 will not interfere with picture stability, and variations in size may be compensated by varying the scan coverage as described in Example IA above.

EXAMPLE II

Same as Example I with the following changes. The turntable is servo controlled as in FIG. 6 and locked to the vertical sync circuits 222 to give a constant tangential velocity of 0.9 inch per second, maintaining the 8:3 aspect ratio of each field. The tracks are separated by a ten mil space (index distance about fifty mils per revolution of the disc). In the space between tracks a phonograph type sound track is pressed, which is followed during playback by a stylus in a phono cartridge mounted with a limited side-play adjacent the photocell to allow the stylus to rest freely in the proper groove. The interleaved picture and sound grooves extend inwards to about a three inch diameter. The playback sync and deflection include an accurately controlled 15,734.264 cycle per second horizontal generator (NTSC color standard) as part of component 222 with the vertical generator of component 85c locked to the horizontal to give 262.5 lines per field, i.e. to give a field scanning frequency of 59.94 cycles per second.

This system, while more elaborate than in Example I, gives better picture quality and longer recording time. The recording time can be increased further by reducing the space between picture tracks.

EXAMPLE IIA

This example includes all of the parameters of Example II and the following further specifics referencing the preceding description.

RECORDING

1. Record disc 10 together with cathode ray tube 90 and lens system 93 has an overall resolution of 400 line pairs per millimeter.

2. Apparatus of FIGS. 2, 3 and 12A with scanning line 19 focussed on the undersurface of the record. Case 150,151 of light-tight construction.

3. Same as item 3 (Recording) in Example IA. The horizontal sync of the signal being recorded would nominally be at a frequency of 15734.26 CPS.

4. The speed of rotation of turntable 32 is servo controlled and locked to the vertical sync of the video signal supplied at line 161, so that each track section of track 12 is recorded with a tangential velocity of about fifteen mils per vertical sync period or about 900 mils per second (more precisely 0.9 inch per second).

5. The control signal to be scanned by photocell 227, FIG. 6, incudes vertical sync signals of the composite video signal as recorded, and any variation in recorded control signals is within the tolerance limits corresponding to the sync tolerance of conventional broadcast television receivers, e.g. about plus or minus five percent.

6. The recorded lines are produced by a recording light spot of about fifty microinch diameter so that the scan lines do not overlap with respect to the vertical scan direction on the target 216. Recorded lines may merge, depending on film resolution.

PLAYBACK

1. Record disc as produced by the procedure of Example IIA and with other conditions as in Example II.

2. Apparatus of FIGS. 2-6, but with a lightproof enclosure enclosing the light path 250 in the form of an annulus closely encircling the path and provided with black velvet extending upwardly to engage the undersurface of record 10 in all operating positions of the lens system 85b relative to the record. The upper side of cantilever spring 140 is provided with a ring of soft light blocking material surrounding aperture 140a for engaging lightproof casing 134, FIG. 3, and preventing access of external light to the path of light leading from light source 22, so that the playback light path is shielded from ambient light throughout its length.

3. The component 222, FIG. 6, includes an accurate crystal controlled horizontal line rate oscillator operating at the NTSC color standard line rate and a vertical field rate generator locked (by a digital divider circuit) to the horizontal line rate oscillator to supply a field rate signal for every 262.5 line rate pulses. The speed of rotation of the turntable is servo controlled as in FIG. 6 and locked to the output of the vertical field rate generator of component 222 so that the video track 12 is traversed with a uniform tangential velocity of about fifteen mils per vertical field period (specifically 0.9 inch per second).

4. The accurate vertical rate oscillator of component 222 controls the deflection and blanking circuits of component 85c, FIG. 4, and controls the pulse output of component 215, so that recorded field images such as 14-1, 14-2 are flashed during the vertical blanking intervals.

5. The reproduced composite video signal from the system of FIG. 4 conforms to the video signal as recorded with the line rate conforming to the NTSC color standard, and preferably the horizontal sync pulses are accurately derived from the standard oscillator of component 85c.

6. The beam diameter of vidicon 85a during playback may be of any convenient size consistent with the desired system resolution.

EXAMPLE III

Same as Example I except that a six inch disc is used, and the record turns at 3.33 RPM. With a spiral of fifteen tracks a playing time of about five minutes is obtained in a ring less than an inch wide. The track pitch is 0.062 inches, with pictures 0.040 inch wide (in the radial direction). A variable area photographic sound track is located in the space between picture tracks. The picture master is negative, from a flying spot line scanner modulated by a signal of polarity normally used for viewing. The copies are positive contact prints made from the negative. The interval between picture fields is blanked out during recording giving a black area separating the fields on the print for triggering the vertical sync during playback. This small record is useful for popular programs and for educational items.

EXAMPLE III-A

Same as Example III except that the sound track area is intermediate an outer video track such as 12, FIG. 1, and an inner control track (corresponding to track 25, FIG. 1). Thus the sound transducer would be equally spaced between a video transducer located at 22, FIG. 2, and a control transducer for recording vertical sync marks located at 120, FIG. 2. The control mark scanner 120, 121, FIG. 3, would then supply the vertical rate control signals for component 701, FIG. 6, which are compared in phase comparator 226 to maintain the synchronism of the playback rotational speed with the flashing of a light source located at 22, FIG. 4.

EXAMPLE IV

Similar to Example II but with twelve inch diameter disc and enlarged images 0.08 inches wide (in the radial direction) and a constant tangential velocity of 1.8 inches per second, giving a higher quality image of eight to ten minutes duration, with color capacity, and using film having a resolution of 400 line pairs per millimeter.

EXAMPLE IV-A

Similar to Example II except that the images are originally on motion picture film which are reduction printed, frame by frame onto the disc. There are thirty complete recorded frame images per 0.9 inch tangential distance along video track 12, FIG. 1, instead of sixty fields of Example II in the same distance, and the recorded frame images have an aspect ratio of 4:3 instead of 8:3 for the recorded field images. Playback is by means of the vidicon 85a, FIG. 4, which gives an output of sixty interlaced fields per second.

It will be apparent that many further modifications and variations may be effected without departing from the scope of the concepts and teachings of the present invention. The various alternatives and modifications expressly referred to are each specifically disclosed as being utilized with each of the illustrated embodiments to the extent compatible therewith. As an example, for accuracy the disc 10 can have a rigid backing of glass. In case of an opaque record, the backing can have the same configuration as record 10 and be of metal, for example, the metal being at the top side of the record for a recording mechanism as in FIGS. 2 and 3, and playback being of reflected light. In this case a reflex mirror could be included in the upper chamber of lens system 93 to gether the light reflected from the record surface and direct it to a local vidicon in 93.

EXAMPLE V

The pictures are recorded on a six inch diameter disc moving at 3⅓ revolutions per minute with continuous motion. A flying spot scanner such as indicated at 90 in FIG. 3 is operated with a vertical deflection rate of sixty cycles per second and with line rate deflection at a rate of 15,750 cycles per second. The horizontal scan lines as focused on the record are deflected by the vertical deflection system in the same direction as the record is moving but at twice the record speed. The aspect ratio of the recorded images has a maximum value of eight to three as described with reference to FIG. 13. The shape of the recorded picture is similar to that given in FIG. 13, but the scan lines are not all perfectly parallel to the central radial axis of the recorded image because of the movement of the record during the recording operation. As the tracks get closer to the center of the disc, the circumferential extent allocated to each image becomes less as shown in FIG. 13, and the vertical deflection of the flying spot scanner is progressively reduced accordingly as described in reference to FIG. 14, and by means of a variable resistor as indicated at 410 in FIG. 2. For example, at ⅔ of the maximum radius, the vertical deflection is reduced to ⅔ of its extent at the maximum radius track, thus maintaining approximately the relation of the deflection velocity of the scanning beam in the direction of record motion as being equal to substantially twice the record velocity at the radius being scanned. The writing beam is blanked out during retrace and the recorded scan lines form the field images such as generally shown in FIG. 13, with the successive recorded lines of a field being successively offset in the direction of recording motion. Thus, the recorded images are mirror images of the recorded images produced as indicated in FIG. 1B.

During recording, the horizontal deflection of the scanner 90 is arranged to leave an unexposed margin for control marks such as 421, FIG. 13, and such control marks may be produced by means of a light emitting diode focussed on the film through a small rectangular aperture and flashed in response to each vertical sync pulse. The triggering of the control mark flash in each case is delayed so that the mark lies on the radial center line of the recorded image as indicated in FIG. 13.

Playback is then accomplished as described with respect to FIGS. 13–15, the vertical scan of the playback vidicon being progressively reduced by means of a variable resistor as indicated at 450 in FIG. 4.

EXAMPLE V-A

With the recording of Example V, playback may be by means of a flying spot scanner and photocell as shown in FIGS. 2 and 3, but a correction must be made for the image inversion during recording. This can be done by inverting the record itself during printing or duplicating and reversing the direction of the playback drive as compared to the direction during recording so as to follow the inverted spiral. Alternatively, the record of Example V can be played back with a flying spot scanner such as shown in FIG. 3 but utilizing the same pattern of vertical deflection as used during recording.

EXAMPLE VI

The images are recorded generally as shown in FIG. 13 but with a flying spot scanner as shown in FIGS. 2 and 3 having a vertical deflection such that the light beam moves in the direction of record motion but at a speed considerably less than the speed of the record track being recorded. In this Example the vertical deflection height is not varied, but the recorded images will vary in circumferential extent as shown in FIG. 13 because of the varying track speed at which the successive field images are recorded. The recorded line format will then conform to that shown in FIG. 1B, and again the maximum aspect ratio which is obtained at the innermost track on the record will be approximately eight to three, while aspect ratios at successively greater radial distances from the center of the disc will be correspondingly less narrow in circumferential extent. The control marks such as indicated at 421 are recorded as in the Example V.

During playback with a vidicon scanner as indicated in FIGS. 4 and 5, the vidicon vertical deflection is progressively reduced by means of a resistor as indicated at 450 in FIG. 4 and as described in reference to FIG. 14 and FIG. 15. The direction of vertical deflection of the vidicon scanner is opposite to that in Example V because of the different recorded line format.

EXAMPLE VI-A

The recording procedure is that given in Example VI, but a flying spot scanner and photosensitive pickup are used for playback as illustrated in FIGS. 2 and 3. The playback scanner is given the same vertical deflection characteristics as described for the recording scanner in Example VI. The speed used during recording is determined by increasing it until satisfactory resolution is obtained at the innermost portions of the video track spiral. While the outer portions of the video track are somewhat underutilized with respect to resolution capability, the simplicity of a constant angular rotating drive is retained.

EXAMPLE VII

A high quality recording is made with images of double size as compared to Example IIA. Depending on the overall playing time desired, the record can be of large diameter, sixteen inches or more if necessary. The record may generally conform with that of FIG. 16 and may be formed by printing reduced images from a motion picture film onto the photosensitive disc as the disc is driven at constant track velocity by means of a spiral control track on the turntable and a scanner such as 231, 240 and servo control as described with respect to FIG. 6. The recorded images have an optimum aspect ratio, approximately four to three, and the sequence of images represents a rate of approximately fifteen pictures per second for real-time action.

The control marks such as indicated at 511-513 in FIG. 16 are recorded simultaneously with the corresponding picture so as to have a precisely fixed relationship to the recorded picture by an LED lamp focussed through a mask and flashed during the interval between pictures.

The record is played back to give a constant rate of fifteen images per second past the playback gate. Each picture is flashed four times with the strobe light to give sixty pictures per second on the vidicon target. Since the record is moving continuously, the shift of the picture between successive flashes is compensated by an optical compensator such as the one previously referred to herein. The compensator operates such that each flashed picture is always located in the same position on the playback vidicon target.

The control marks such as 511-513 are utilized to lock a multivibrator circuit such as shown in FIG. 5 so that the strobe light flashes four times for each recorded picture. Multivibrators may be locked to sync pulses that are a multiple or submultiple of the nominal free running frequency. Alternatively four control pulses are recorded per frame near the margin as in FIG. 1C.

EXAMPLE VII-A

Recording is the same as given for Example VII. During playback, the control marks on the inner spiral with the soundtrack control a stepping motor drive for the picture disc so that each successive recorded image is stopped in alignment with the vidicon target for a duration of 1/15 second, whereupon the strobe is flashed four times. The circuitry may be as in Example VII, synchronized by the control marks. The stepping motor is then energized to precisely position the next picture, for example by energizing the stepping motor and braking the picture disc motion within 1/60 second in response to the control signal produced by such control mark. A sound recording accompanies the video recording on a record as illustrated in FIG. 7, the sound recording being produced by moving the central portion of the record at a uniform rate as the outer portion of the record moves intermittently.

EXAMPLE VII-B

The record of Example VII-A is moved by means of an intermittent drive such as indicated in FIGS. 7 and 8 but at a fraction of its recording speed, for example at ¼ of its average recording speed so that five pictures would pass the gate per second. Each picture is flashed twelve times per second before indexing to the next picture. The vidicon target then receives sixty images per second as before, but the image or motion is at ¼ the real-time speed.

EXAMPLE VII-C

The record of Example VII-A is played back with an average track speed which is a multiple of the normal track speed. At double speed, thirty images pass the gate per second, and each picture is flashed twice. The flash rate is always sixty per second on the vidicon target. For the double speed playback, the action is twice as fast as real-time action. At eight-times normal recording speed, 120 images per second pass the gate, and with sixty flashes per second, every other picture is produced on the vidicon target.

EXAMPLE VII-D

For economy or long play on a given size disc as described with respect to Example VII, only a fraction of the original set of pictures are recorded. For example, every third frame of the program of Example VII is registered and the intervening two frames are not used, but there is no gap on the record between the registered pictures. the playback is at ⅓ the speed that would be necessary if pictures had not been omitted. Each picture is flashed twelves times to give sixty flashes per second on the vidicon target. The action is at normal real time speed, but there may be some degredation because of the omitted pictures.

EXAMPLE VII E

In this Example, the record is made with constant angular velocity as in Example I, but the radial width of pictures is as in Example VII and the tangential height is such as to give an aspect ratio of about four to three at the innermost video track. A flying spot scanner as indicated at 90, FIG. 3, is used for the recording and is operated to give complete recorded frames as described in reference to FIG. 1C. The vertical deflection current of the scanner 90 is varied as indicated at 410 in FIG. 2 so that the same number of recorded frames fit into each revolution of the disc regardless of the radial distance to the track being scanned. The record disc is provided with radial slots as indicated at 263 in FIG. 7 with one such slot 263 for each recorded picture frame. During playback, an intermittent drive such as indicated at 274, FIG. 8, operates on the slots 263 to drive the disc. The intermittent drive may consist of a claw mechanism such as is well known in the eight millimeter motion picture art. This drive is geared by means of a toothed belt as indicated at 283, FIG. 8, to the inner turntable 280 so that the disc 262 has its intermittent motion synchronized with the continuous rotary motion of turntable 280. The video track may contain fifteen pictures per second, each flashed four times onto the vidicon target before advance to the next picture, giving sixty light images on the vidicon target per second. The vidicon vertical deflection is diminished as the scanning radius is progressively reduced as described in reference to FIG. 14. The vidicon vertical scan rate and the flash rate are locked to the rate of the claw repetition such that each flash occurs during a vertical retrace interval of the vidicon scanning beam.

It will be apparent that many modifications and variations may be effected without departing from the scope of the novel concepts and teachings of the present invention.

I claim as my invention:

1. A video transducer system comprising a record disc having a central axis of rotation and having successive radially offset arcuate track sections each extending arcuately about the central axis, said arcuate track sections each having a series of recorded images recorded thereon and each recorded image comprising an ordered plural dimensional spacial distribution of recorded image elements corresponding to a plural dimensional visual image, with the recorded image elements corresponding to a single visual image providing a recorded image frame and the successive recorded images of said arcuate video record track presenting a time sequence of said recorded image frames to provide a substantial number of recorded image frames per inch along each arcuate track section of the video record track, means comprising a flashing light source for illuminating said recorded images in sequence, and video camera means for receiving light images of the illuminated recorded images and for transmitting a video signal to electronically reproduce the series of recorded images.

2. A video transducer system according to claim 1 with each recorded image frame comprising a pair of recorded sub-frames, each recorded sub-frame having a width to height ratio of substantially greater than four to three, the sub-frames being constructed to produce light images for sequential line by line scanning by said video camera means to generate field signals representing interlaced fields with respect to a single visual image and at a video field rate when successive sub-frames along the arcuate video record track are scanned in sequence during reproduction.

3. A video transducer system in accordance with claim 1 with said record disc having said series of discrete recorded images arranged along a spiral video record track and having a continuous spiral sound track entirely within said spiral video record track with at least forty-five convolutions over a radial extent of less than two inches and with a recorded time variation of a recorded sound signal on said spiral sound track such that a convolution of the spiral sound track corresponds to the same time interval as a related convolution of said spiral video record track.

4. A video transducer system in accordance with claim 1 with said record disc having said series of recorded images arranged along a spiral video record track extending about said central axis with successive convolutions of said spiral video record track having a progressively increasing radial distance from said central axis, said spiral video record track having a succession of recorded images representing alternate odd-line and even-line fields of an interlaced television signal arranged along each of the successive convolutions thereof.

5. A video transducer system according to claim 4 with the recorded images being composed of recorded lines disposed generally radially relative to said central axis, and successive recorded lines of each recorded image being in alignment with respect to a generally tangential direction along said spiral video record track.

6. A video transducer system according to claim 1 with each recorded image frame comprising a pair of recorded sub-frames spaced along one of said arcuate track sections, each sub-frame having an aspect ratio of substantially greater than four to three and corresponding to a ratio value in the range from about 2.3 to about 3.8.

7. A video transducer system according to claim 6 with said means comprising a flashing light source for illuminating said recorded images in sequence operating to produce one flash for each sub-frame so that said video camera means receives a light image of each sub-frame and scans the same to produce a video field signal having a line repetition rate of substantially 15,750 lines per second and having a field repetition rate of substantially sixty fields per second.

8. A video transducer system according to claim 1 with each recorded image frame comprising a pair of recorded sub-frames spaced along one of the offset arcuate track sections, said sub-frames having substantially a constant aspect ratio of substantially eight to three.

9. A video transducer system according to claim 8 with said means comprising a flashing light source for illuminating said recorded images in sequence producing one flash of light for each recorded sub-frame, said video camera means receiving the successive light images of the illuminated recorded sub-frames at a rate of sixty per second and producing a video signal for reconstructing said sub-frames corresponding to a single visual image by means of interlaced display of each pair of sub-frames.

10. A video transducer system in accordance with claim 1 with said record disc having said series of recorded images recorded along a spiral video record track extending about said central axis with successive convolutions of said spiral video record track having a progressively increasing radial distance from said central axis, said spiral video record track having a succession of recorded images representing alternately therealong an odd-line field and an even-line field of an interlaced television signal arranged along each of the successive convolutions thereof, said recorded images being of constant size over the entire extent of the spiral video record track, and said illuminating means providing a flash illumination for each of said recorded images.

11. A video transducer system in accordance with claim 10 with said illuminating means producing flashes of said flashing light source at a rate of sixty per second, and said video camera means supplying an interlaced video signal having an interlaced field rate of sixty fields per second so as to provide for interlaced display of the succession of recorded images.

12. A video transducer system according to claim 10 with the recorded images being composes of recorded lines disposed generally radially relative to said central axis, and successive recorded lines of each recorded image being in alignment with respect to a generally tangental direction along said spiral video record track, said recorded lines of each recorded image having a constant spacing over the extent of the spiral video record track such that each recorded image provides a fixed aspect ratio of substantially eight to three.

13. The method of transducing video signals which comprises recording images on a disc record along successive arcuate tracks at
varying radial distances from an axis of rotation, rotating the disc record about its axis of rotation during playback, illuminating each recorded image during continuous rotation of the
disc record for a duration of less than two milliseconds
to expose a light sensitive target to a light image in accordance with said recorded image, and scanning the target to produce an electronic video signal.

14. The method of claim 13 with the scanning of the target occupying a time interval substantially longer than the duration of the illuminating of each recorded image.

15. The method of claim 13 with the scanning of the target in conjunction with the illuminating of the successive recorded images along the successive arcuate tracks producing an electronic video signal comprising interlaced video field signals.

16. The method of claim 13 with the illuminating of a given recorded image in the absence of rotation of the disc record serving to restore an electron image to the light sensitive target after each scanning thereof so as to produce an electronic video signal representing the recorded image being scanned.

17. The method of claim 13 with the illuminating of each recorded image being for a duration of less than 63.5 microseconds.

18. The method of claim 13 with the time interval between the illuminating of successive recorded images on the disc record being on the order of 1/60 second.

19. The method of claim 13 with the scanning of the target taking place at a predetermined line rate and field rate, and the illuminating step taking place in each case between successive field rate scanning cycles.

20. The method of claim 13 with the scanning of the target producing a sequence of video picture signals with intervals therebetween, and the illuminating of the recorded image taking place during such intervals between picture signals.

21. A video transducer system comprising a record disc having a central axis of rotation and having an arcuate video record track comprising a succession of radially offset arcuate track sections with a series of recorded images recorded thereon each recorded image comprising an ordered plural dimensional spacial distribution of recorded image elements corresponding to respective ones of a plural dimensional array of elemental regions of a plural dimensional visual image, with the image elements corresponding to a single visual image providing a recorded image frame and the successive recorded images of said arcuate video record track presenting a time sequence of said recorded image frames to provide a reproduction frame rate of substantially thirty frames per second, and there being a substantial number of recorded image frames along each arcuate track section of the video record track, and a transducer device having an optical scanning area of a size for registering with a recorded image on the video record track and having a cyclical line rate scanning operation and being periodically deflectable in a line scanning direction at a video line rate to generate a line rate video signal and having a cyclical field rate scanning operation and being periodically progressively deflectable at a video field rate transversely to the line scanning direction so as to produce interlaced video field signals in accordance with each successive recorded image frame on the arcuate video record track.

22. A video transducer system according to claim 21 with said transducer device having light source means for illuminating each recorded image, and means for pulsing said light source means for a time interval of less than one hundred microseconds.

23. A video transducer system according to claim 21 with said transducer device having a cyclical field rate scanning operation including periodic progressive deflection transverse to the line scanning direction and interposed field rate retrace intervals, said transducer device having light source means for illuminating each recorded image, and means for pulsing said light source means during said vertical retrace intervals of the cyclical field rate scanning operation of said transducer device.

24. A video transducer system according to claim 21 with said arcuate video record track on said disc having control marks radially offset from the respective recorded images, and the transducer device having means scanning said control marks to control the rate of rotation of said record disc.

25. A video transducer system according to claim 21 with the arcuate video record track on said disc having said recorded images of equal size and having control marks independent of the recorded images for maintaining a constant tangential speed of the record track relative to the transducer device during scanning of the successive arcuate track sections, and disc record speed control means connected to said control mark scanning means and to a source of reference pulses occurring at the cyclical field rate of said cyclical field rate scanning operation, and for controlling the rotation of said disc record to maintain a constant phase relationship therebetween.

26. A video transducer system according to claim 25 with said transducer device having light source means for illuminating each recorded image, and means controlled in accordance with said reference vertical pulse rate for pulsing said light source means to illuminate each of the successive recorded images for a time interval of less than one hundred microseconds.

27. The method of transducing a video signal which comprises:
rotating a disc record medium about a central axis,
optically recording successive lines of a video signal transversely of an arcuate record track of the rotating disc record medium to produce recorded images each capable of direct projection as a complete light image onto a complete optical image-receiving video camera,
recording associated vertical scanning rate signals of the video signal in synchronism with the successive recorded images to provide recorded control marks for use in controlling playback of the recorded images,
during playback of the disc record medium:
rotating the disc record medium continuously with the movement of the recorded control marks defining a video reproduction rate of thirty frames per second,
flashing a light source in synchronism with the movement of the recorded control marks and such that each flash of the light source produces a complete light image based on the simultaneous illumination of all the recorded lines of one of said recorded images,
transmitting said complete light image based on said simultaneous illumination of all said recorded lines of said one recorded image onto a complete optical image-receiving face of a video camera,
operating said video camera at a line scan rate of about 15750 lines per second and at a frame scan rate in accordance with said video reproduction rate to produce an electrical video signal in accordance with the transmitted complete light,
repeatedly flashing the light source with duration and timing of each flash enabling a complete scan of each transmitted complete light image by the video camera and to enable the video camera to scan each successive complete light image prior to transmission of the next succeeding complete light image while supplying an electrical video signal with a frame rate of thirty frames per second.

28. The method of claim 27, with the flashing of the light source producing a flash with a time duration of not greater than about one hundred microseconds.

* * * * *